3,530,138
3 - HYDROXY - PYRID - 2 - THIONES AND 3-HYDROXY-2-MERCAPTO - PYRIDINES AND THEIR ETHERS

Kjell Undheim, Asker, and Vegard Nordal and Knut Tjonneland, Oslo, Norway, assignors to Nyegaard & Co. A/S, Oslo, Norway, a Norwegian body corporate
No Drawing. Filed May 12, 1967, Ser. No. 637,889
Claims priority, application Great Britain, May 12, 1966, 21,078/66
Int. Cl. C07d 31/50
U.S. Cl. 260—294.8                                    7 Claims

ABSTRACT OF THE DISCLOSURE 3-hydroxy-pyrid-2-thiones and the tautomeric 3-hydroxy-2-mercapto-pyridines and their N- and S-lower alkyl and substituted lower alkyl derivatives. These compounds and their physiologically compatible acid addition salts have antibacterial and antiviral activity. Methods of preparing these compounds are disclosed.

---

This invention relates to novel heterocyclic compounds having pharmacodynamic activity.

We have found that a novel class of relatively simple pyridine derivatives possesses important antiviral and antibacterial activity. These compounds possess an oxygen function in the 3-position and a sulphur function in the 2-position and the proximity of the three adjacent electro-negative groupings is thought to be responsible for their physiological activity.

According to the present invention we provide compounds of the general formula

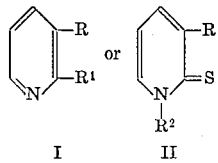

I                II and physiologically compatible acid addition and quaternary ammonium salts and zwitterions thereof (where R represents OH, O$^-$ or an ether or acyloxy group, R$^1$ represents a mercapto group; an aliphatic araliphatic or aromatic thioether group which may carry one or more halogen atoms or carboxyl, esterified carboxyl, carbamoyl, N-substiuted carbamoyl, cyano, hydroxy, ether, acyloxy, thioether, acylthio, secondary and tertiary amino or N-acylamino groups; an acylthio group; an isothiouronium group; an organic disulphide group; a sulphonyloxy group; or an alkyl, aralkyl or aryl sulphoxide group; and R$^2$ is hydrogen or an aliphatic group which may carry one of the substituents defined above for the thioether group R$^1$, and the 4-, 5- and 6-positions carry hydrogen or halogen atoms, nitro, ether, acyloxy, thioether, acylthio, primary, secondary and tertiary amino, N-acylamino, carboxylic ester or carbamoyl groups or aliphatic, araliphthatic or aromatic hydrocarbon groups.

The quaternary salts and zwitterions preferably carry at the pyridine nitrogen atom a group R$^2$ as defined above.

Where R represents O$^-$, the negatively charged ion may be balanced by a positive ion such as a metal ion, e.g., an alkali metal or alkaline earth metal ion, or a cation of an organic base, or may be balanced by a positive charge on the pyridine nitrogen to form a zwitterion.

Similarly when R is other than O$^-$ and the pyridine nitrogen is quaternised, the positive charge may be balanced by a negative ion, e.g., an anion from an organic or inorganic acid, or by zwitterion formation with a carboxyl group present at the 1-position or a sulphonyloxy group at the 2-position of the pyridine ring.

In the series of compounds where R$^1$ is mercapto and R$^2$ is hydrogen, the Formulas I and II show the two tautomeric forms, 2-mercapto-pyridine and pyrid-2-thione, in which these compounds can exist.

All groupings containing aliphatic moieties preferably have 1–20 carbon atoms, advantageously 1–6 carbon atoms. Halogen atoms, where present, may for example be fluorine, chlorine or bromine atoms. Where R$^1$ is an organic disulphide group the compounds are advantageously dimers of the corresponding 2-mercapto compounds, e.g., having the structure

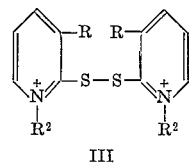

III

Ether groups and thioether groups where present may, for example, be alkoxy or alkylthio groups, e.g., methoxy, ethoxy, propoxy, butoxy, methylthio, ethylthio groups, etc., or aralkoxy or aralkylthio groups such as benzyloxy or phenethylthio groups. Acyloxy groups, where present, may, for example, be lower aliphatic acyloxy groups such as acetoxy or propionoxy groups or aromatic acyloxy groups such as benzoyloxy groups.

The tertiary nitrogen compounds according to the invention, both of the thioether type I and the thiolactam type II, possess antiviral activity, e.g., against Japanese B. Encephalitis virus, antibacterial activity, e.g., against E. Coli and anticancer activity, e.g., against Hela cells.

Thus, for example, 3-hydroxy-6-methyl-pyrid-2-thione and the corresponding disulphide dimer, 3-hydroxy-6-methyl-2-methylthio-pyridine, 2 - ($\beta$-hydroxyethylthio)-3-hydroxy-6-methyl-pyridine and 3-hydroxy-6-methylpyridine-2-sulphonic acid all show especially useful activity against Jap. B. Encephalitis virus. 3-hydroxy-6-methyl-pyrid-2-thione and its N-ethyl derivative, and S-methyl, S-ethyl, S-($\beta$-hydroxyethyl) and S-carboxymethyl derivatives, 3-hydroxy-6-methyl-pyridine-2-sulphonic acid and its N-ethyl pyridinium derivative, 2-ethylthio-3-hydroxy-6-methylpyridine-S-oxide and 2-($\beta$-hydroxyethylthio)-3-hydroxy-6-methyl-pyridine-S-oxide all showed outsanding activity against Hela cells.

3-hydroxy-6-methyl-pyrid-2-thione and its N-ethyl, S-methyl and S-ethyl derivatives all showed strong activity against E. Coli.

The quaternary salts and zwitterions according to the invention show suppressed activity against bacterial and viral infections and cancer but activity against *Salmonella typhimurium* has been demonstrated, particularly notable compound being 1-carboxymethyl-2-methylthio-6-methylpyridinium-3-oxide having the structure

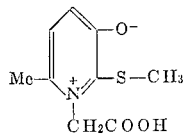

As hereinbefore mentioned, the compounds of Formula I and II have valuable pharmacodynamic properties. The invention therefore further provides pharmaceutical compositions containing, as active ingredient, at least one compound of the Formula I or Formula II and/or a physiologically compatible acid addition salt, quaternary ammonium salt or zwitterion thereof together with a pharmaceutical carrier or excipient. The compositions can be presented in forms suitable for oral or parenteral administration. Thus, for example, compositions for oral administration can be solid or liquid and can take the form of tablets, coated tablets or dragees, pills, cachets, capsules, granules, powders, syrups, drop solutions, suspensions, etc., such compositions comprising carriers or excipients conveniently used in the pharmaceutical art. Thus suitable tablet excipients include lactose, potato and maize starches, talc, gelatine, stearic and silicic acid, stearates and polyvinylpyrrolidone.

For parenteral administration, the carrier or excipient may be a sterile parenterally acceptable liquid, e.g., pyrogen-free water or an aqueous solution of polyvinyl-pyrrolidone or parenterally acceptable oil, e.g., arachis oil, contained in ampoules.

Advantageously, the compositions can be formulated as dosage units, each unit being capable of supplying a fixed dose of active ingredient. Tablets, coated tablets or dragees, pills, cachets, ampoules and capsules are examples of preferred dosage unit forms according to the invention.

Alternatively the compositions may be formulated as powders, granules, syrups, drop solutions, suspenions, emulsions or elixirs.

The novel pyridine derivatives according to the invention may be prepared in any convenient way, for example by one of the following methods which constitute further features of the invention:

(1) A pyridine derivative of the general formula

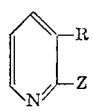    IV (where R has the above meaning and Z is a reactive ester group) is condensed with a sulphur derivative R¹H or a salt thereof. Where R¹ is to be a mercapto group, the pyridine IV may be reacted with a metal hydrosulphide, e.g., an alkali metal hydrosulphide such as sodium or potassium hydrosulphide. This reaction is preferably effected at elevated temperature, advantageously in a high boiling point inert solvent such as propylene- or ethylene glycol, dimethyl formamide, etc. If thiourea is used instead of a hydrosulphide, the product is an isothiouronium compound which may be converted to SH by alkaline hydrolysis or may be used as such in the principal reaction as described above. Compounds in which R¹ is a thioether group can be prepared by replacing the hydrosulphide by the corresponding organic thiol, while reaction with thiol-carboxylic acids such as thiol-acetic acid gives compounds in which R¹ is an acylthio group. Similarly reaction with alkyl xanthate, thiosulphate or thiocyanate gives compounds in which R¹ is S.C.S.O. Alk, S₂O₃ or SCN and which readily yield the desired thiol in which R¹ is SH by hydrolysis.

It should be noted that while 2-halogeno pyridines as aromatic halides might have been expected to be unreactive, the presence of the adjacent electronegative groups allows nucleophilic substitution.

The compounds of Formula IV in which Z is a halogen atom can be prepared from the corresponding compounds of the skeletal formula

    V by direct halogenation. The 2-bromo compounds may be prepared by reaction with molecular bromine, preferably in the presence of a tertiary organic amine such as pyridine or in a liquid carboxylic acid in the presence of a salt thereof, for example acetic acid/sodium acetate. N-bromoamides or -imides may also be used for bromination. 2-chlorocompounds may be prepared by diazotisation of the corresponding 2-amino-pyridine and replacement of the diazo group by a chlorine atom either by carrying out the reaction in hydrochloric acid or by reaction of the diazonium compound with hydrogen peroxide and hydrochloric acid. 2-iodo compounds may be prepared by reaction of compounds of Formula V with molecular iodine under basic conditions, e.g., in the presence of aqueous sodium bicarbonate or, more preferably, as an iodine-pyridine complex.

(2) Thiolactams of the formula

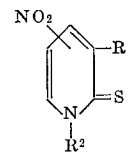    IIa (where R and R² have the above meaning) may be prepared by reacting the corresponding lactam with phosphorus pentasulphide. This reaction is preferably effected in an inert solvent, e.g., benzene or toluene, at a moderately elevated temperature, e.g., in the range 15–100° C. The nitro group may then be reduced to an amino group which can itself subsequently be converted into other desired groups such as acylamido or secondary or tertiary amino groups by conventional methods. The lactam starting material may conveniently be prepared by nitration of the corresponding unnitrated lactam by methods conventional for the nitration of aromatic compounds.

(3) Rearrangement by acid catalysis of a compound of the general formula

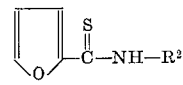

The acid used as catalyst may for example be a mineral acid, e.g., a hydrohalic acid or sulphuric acid. The reaction solvent is preferably a polar solvent such as water, an alcohol such as methanol or ethanol or a substituted amide solvent such as dimethyl- or diethyl formamide or -acetamide. The furan starting material may be prepared, for example, by reaction of a corresponding ester, thioester or thioacyl halide with ammonia or an amine R²NH₂.

(4) Reaction of a compound of the general formula

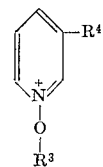

(where R³ is an alkyl or aralkyl group and R⁴ is an ether or acyloxy group) with hydrogen sulphide or a thiol or a salt thereof. The reaction is preferably effected in a polar solvent, e.g., water, an alcohol such as ethanol or methanol or a substituted amide solvent such as dimethylor diethyl-formamide or -acetamide. The thiol may, for example, be an alkyl, aralkyl or aromatic thiol and the reaction should be effected under conditions allowing nucleophilic attack by the anion of the hydrosulphide or thiol reactant. The reaction results in elimination of the alcohol $R^3OH$.

If $R^4$ in the starting material is a tetrahydropyranyl group prepared by reacting dihydropyran with the corresponding 3-hydroxy-pyridine derivative, the 3-hydroxy group can readily be regenerated in the product by acid hydrolysis and if the group introduced at the 2-position is a thioether group and a mercapto group is required, acid hydrolysis may again be used to effect the desired conversion.

(5) Preparation of quaternary compounds substituted at the 4-position by reaction of quaternary compounds of the general formula

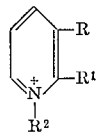

(where R, $R^1$ and $R^2$ have the above meanings) with an electrophilic reagent, e.g., a halogen or reagent supplying positive halogen ions, a nitrating agent, e.g., nitric acid in acetic acid-sulphuric acid or with a diazonium salt. Thus, for example, bromine can be introduced by reaction with molecular bromine, e.g., in acetic acid containing an alkali metal acetate, while iodine can be introduced using sodium iododichloride.

(6) Derivatives of Formula I in which $R^1$ is a sulphonyloxy or alkyl sulphone group may be prepared by oxidation of the corresponding mercaptan or thioether using a peracid or hydrogen peroxide in an acid such as formic acid or an equivalent.

Mercapto groups are oxidised to sulphonyloxy groups $SO_3$— but thioether groups add only a single oxygen to form an alkylsulphoxide.

(7) Preparation of quaternary salts and zwitterions of the compounds of Formula I may be effected by reacting the corresponding compounds in which $R^1$ is other than mercapto with a quaternising agent. The reagent may for example be of the formula $R^2Z$ where Z is a reactive ester substituent, e.g., a chlorine, bromine or iodine atom, an aliphatic or aromatic sulphonyl group or sulphate ester group such as a toluene-p-sulphonyl or methanesulphonyl group or methylsulphate group. Where there are no acidic groups present in the molecule, a quaternary salt having an anion $Z^-$ will be formed but if such an acidic group is present a zwitterion may be formed. The reaction is preferably effected in the presence of a base, e.g., an alkali metal alcoholate or a nitrogen base such as pyridine.

(8) Preparation of compounds of Formula I in which $R^1$ is a thioether group may be effected by reaction of the corresponding compound of Formula I or a quaternary salt or zwitterion thereof in which $R^1$ is a mercapto group, or a compound of Formula II with a reagent $R^4Z$ where $R^4$ is an aliphatic group which may be substituted as defined for the case when $R^1$ is an aliphatic thioether group and Z has the meaning given in (6) above. Where $R^1$ is mercapto we have found that such a reagent will always react to form a thioether rather than a quaternary derivative at the nitrogen or an ether derivative at the 3-oxygen function. Where a compound of Formula II is reacted, vigorous conditions are required. The reagent reacting with the 2-mercapto group may also be an olefin, for example acrylic acid or α-bromo-acrylic acid. It is noteworthy that reaction takes place more readily with the olefinic bond than the α-bromine atom in the above α-bromo-olefin.

In all the methods 1–8, the 4-, 5- and 6-positions of the pyridine starting material may carry any of the atoms or groupings defined in relation to the compounds of Formulae I and II, with the exception of method 5, where the 4-position must of course be free.

The compounds of Formula IV used as starting materials in reaction 1 are all new compounds with the exception of the 6-unsubstitued and 6-methyl compounds having halogen in the 2-position. These intermediates are useful compounds in preparing the substances of Formula I and II and in addition the compound 2,4-dibromo-3-hydroxy-6-methyl-pyridine has shown pronounced activity against both Jap. B. Encephalitis and *Salmonella typhimurium*.

In addition to their possessing physiological activity, the compounds of Formulae I and II are of use as intermediates in the synthesis of related bicyclic compounds, namely thiazolo-[3,2-a]-pyridinium derivatives of the general formula

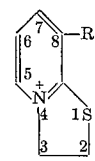

where R has the above meaning and the 2, 3, 5, 6 and 7 positions can carry any of the substituents defined for the 4-, 5- and 6-positions of the pyridine derivatives of Formulae I and II. These bicyclic compounds have been found to show activity closely similar to that of the quaternary salts and zwitterions of the compounds of Formulae I and II. One compound of this type, namely 5 - methyl - 8 - hydroxy-dihydrothiazolo-[3,2-a]-pyridinium-3-carboxylate has been isolated from natural sources and is described and claimed in copending application, Ser. No. 470,181, filed July 7, 1965, now abandoned.

(CoU). This substance is designated for convenience CoU.

We have found that compounds of general Formula VI can be prepared by reacting in one or more stages pyridine compounds of Formulae I and II or the corresponding compounds having a reactive ester group in the 2-position with a quaternising or etherifying agent so that either the nitrogen atom is quaternised or an S-atom at the 2-position is etherified, the reagent being such that the added group is an ethyl group carrying a β-substituent which will allow subsequent ring closure to form the desired dihydrothiazole ring.

According to a further feature of the present invention we provide a process for the preparation of compounds of general formula

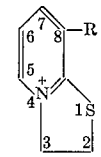

(where R has the above meaning) in which a pyridine of the general formula

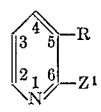

(where R has the above meaning and $Z^1$ is a mercapto group or a substituent convertible thereto), is reacted with a quaternising or etherifying agent to add on to the nitrogen atom or, where $Z^1$ is a mercapto group, alternatively the sulphur atom, an ethyl group carrying a reactive substituent in the β-position, followed by cyclisation to complete the required dihydrothiazole ring.

The reactive substituent which is present in the β-position of the ethyl group which is initially added on to the nitrogen or sulphur atom may be any atom or grouping which can be utilised in closing the desired dihydrothiazole ring. It may, for example, be a reactive ester substituent, e.g., a halogen atom or a reactive ester grouping such as an aliphatic or aromatic sulphonyl group, a substituent convertible thereto (for example a hydroxy group which can readily be converted to halogen or an aromatic or aliphatic sulphonyloxy group) or a mercapto group.

The substituent $Z^1$ may be, for example, besides a mercapto group SH, a thioether, acylthio or isothiouronium group, an organic disulphide group (such as exists in dimeric oxidised forms of the compound in which $Z^1$ is SH) or a reactive ester substituent such as a halogen atom or an ester group such as an aromatic or aliphatic sulphonyl group, e.g., a tosyl or mesyl group.

The process according to the invention may be carried out in a number of ways depending on the nature of $Z^1$ and of the quaternising or etherifying agent.

The quaternising or etherifying agent may, for example, be a bifunctional ethane derivative having the structure

VIII where X is a reactive ester substituent and Y is such that one of Y and $Z^1$ is a mercapto group or a substituent convertible thereto while the other is a reactive ester substituent.

The reactive ester substituent X may be, for example, a halogen atom such as a chlorine, bromine or iodine atom, or a reactive ester grouping such as an aliphatic or aromatic sulphonyl group, e.g., mesyl or tosyl group. A bromine atom is preferred.

One of the two substituents Y and $Z^1$ is preferably a mercapto group while the other is for example one of the substituents listed for the substituent X.

However, the reaction can be carried out in more than one stage and where Y or $Z^1$ is a group convertible to a mercapto group, the first stage of the reaction will be quarternisation of the pyridine nitrogen, eliminating the substituent X as an anion. The respective group Y or $Z^1$ is then converted to a mercapto group and, finally, ring closure is completed by condensation of the SH group with elimination of acid.

The group convertible to SH may, for example, be a thioether, an acylthio or isothiouronium group or an organic disulphide group.

The process can be carried out in a number of ways, depending on the nature of the substituents X, Y and $Z^1$.

Where $Z^1$ is a mercapto group, X and Y are both reactive ester substituents. They may be the same or different. They are preferably both bromine atoms.

The reaction of the SH group $Z^1$ with the atom or grouping of Y eliminates acid and if the reaction is effected under basic conditions, this reaction will usually proceed before quaternisation. If desired, the initial condensation or quaternisation products can be isolated before proceeding to the ring closure. If, however, the reaction is affected under alkaline conditions at elevated temperature for sufficient time for both condensation and quarternisation to take place, the ring closure will be effected in a single stage.

As indicated above, where $Z^1$ is a group convertible to a mercapto group, the reaction may be carried out in three steps namely quarternisation, conversion of $Z^1$ to SH and condensation to complete ring closure. Where $Z^1$ is an isothiouronium group the conversion to SH may be effected by alkaline hydrolysis. Where $Z^1$ is an organic disulphide group conversion to SH may be effected by reduction, e.g., with borohydride.

The quarternisation reaction is preferably effected at elevated temperature for example under reflux of the reaction medium. An inert solvent is preferably present, for example a hydrocarbon solvent such as benzene, toluene, etc., an alcohol such as methanol, ethanol or ethylene or propylene glycol, a substituted amide solvent such as dimethylformamide or dimethylacetamide or a cyclic ether such as dioxan or tetrahydrofuran.

The basic conditions required for the SH condensation reaction may, for example, be generated by adding a base, preferably an alkali metal hydroxide or alkoxide such as sodium hydroxide or alkoxide. The reaction proceeds faster in aqueous alkali than in an alcoholic solution of an alkoxide. Preferably, at least one equivalent of base is used, advantageously about 2 equivalents. On the other hand, the pyridine of Formula VII may itself function as the base provided that the overall conditions are basic.

Since, in both quaternisation and etherification of the SH group, anions are formed, agents which solvate such anions accelerate the reaction. Thus, for example, addition of p-nitrophenol produces a marked reduction in reaction time.

Where the substituents X and Y are identical, and the compound of structure VIII carries substituents, the substituents in 2- and 3-positions of the final product of structure VI may be in alternative positions. Thus, for example, if 3-hydroxy-2-mercapto-6-methyl-pyridine is reacted with methyl $\alpha,\beta$-dibromopropionate and if the reaction is effected under neutral conditions the product is the hydrobromide of the 2-carboxylic ester, methyl iso-CoU. If the reaction is effected initially in alkali, and is allowed to proceed to completion, the product is methyl CoU with the COOMe group in the 3-position.

Where groups X and Y in compound VIII are both reactive ester substituents, under the alkaline conditions required for the single stage reaction elimination of one substituent with hydrogen may take place to produce an olefin so that the quarternising or etherifying agent has a structure of Formula VIII in which Y represents a carbon-carbon bond to the vicinal carbon atom and X is a reactive ester substituent. Such olefins may also be used initially as starting materials and a particularly preferred type of reagent is an $\alpha$-bromo acrylic acid or an amide or an ester thereof or the corresponding nitrile. Such reagents give especially good yields on reaction with the pyridine of Formula VII.

The quarternising or etherifying agent may carry various substituents on the two adjacent carbon atoms which it contains, for example carboxyl, carboxylic ester or carboxylic amide groups, protected hydroxy, mercapto or amino groups, or hydrocarbon groups such as aliphatic, araliphatic or aromatic hydrocarbon groups, which may themselves carry such substituents as protected hydroxy, mercapto or amino functions or carboxyl, carboxylic ester or carboxylic amide groups. One of the substituents X or Y may form a lactone ring with a carboxyl group on the vicinal carbon atom so that on reaction elimination creates an anion which is still bonded to the structure, namely a carboxylate ion.

The most preferred form of the reaction utilises as starting material, a compound of Formula VII in which $Z^1$ is SH or a substituent convertible thereto. Particularly preferred compounds of Formula VII are those in which $Z^1$ has this meaning and there is a substituent in the 6-position, especially a lower alkyl group such as the methyl group present in the corresponding position of CoU. These compounds have not been described in the literature.

The quarternising or etherifying agent of Formula VIII may be prepared in any convenient way. For the synthesis of optically active compounds it is possible for this reagent to be itself optically active and it is especially convenient to prepare such optically active starting materials from naturally occuring products such as amino acids. In the production of optically active CoU itself, one appropriate reagent has the formula

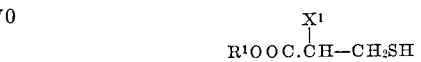

where $R^1$ is hydrogen or an alkyl group and $X^1$ is a halogen atom; this reagent may conveniently be prepared from optically active cysteine by reaction with nitrosyl halide. The quaternising or etherifying agent may also have the formula

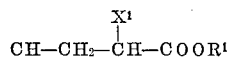

where $R^1$ and $X^1$ have the above meanings, the OH group being converted to a reactive ester substituent such as halogen or a sulphonyloxy group, before completion of ring closure; such as reagent may readily be prepared by reaction of optically active serine with a nitrosyl halide.

The substituent R may, as indicated above, be —OH, —O— or an ether or acyloxy group. Where the structure I has been prepared with R in the form of an ether or acyloxy group, and the 3-hydroxy compound is required, hydrolysis will effect the required conversion. Similarly, where R is OH, the corresponding ether or acyloxy derivative can be formed by reaction with an etherifying or acylating agent.

In the synthesis of compounds of structure VI having a carboxyl group in the 3-position, as in CoU itself, it is often convenient to use a starting compound of Formula VIII carrying a carboxylic ester group followed by hydrolysis of the resulting ester of Formula VI.

Where the product is in zwitterion form, salts may be produced by reaction either with acids or with bases.

The compounds having a free OH group in the 8-position may be reacted with a base to give salt therewith. This OH group appears to be somewhat more strongly acidic than a phenolic hydroxyl group. Where the 8-position carried a non-ionising group and a carboxylate radical is present forming a zwitterion with the nitrogen atom, salts may be formed by reaction with strong bases. Thus, for example, salts can be formed with alkali metal hydroxides, etc., e.g., sodium or potassium hydroxide. Acid addition salts may be formed by reacting a basic or zwitterionic compound according to the invention with an acid. In order to form a salt from a zwitterionic compound the acid must be more strongly acidic than the hydroxyl or carboxyl group involved in the zwitterion structure. The acid may thus, for example, be an inorganic acid, e.g., hydrochloric, hydrobromic, sulphuric, phosphoric or perchloric acid or an organic acid such as acetic, formic, trichloracetic, stearic acid, etc. For pharmaceutical applications, the acid addition salts and salts with bases should be physiologically acceptable but for purification or other uses, this requirement need not apply.

Where the process according to the invention is used to prepare a compound of Formula VI having an asymmetric carbon atom, the use of racemic starting material of Formula VIII produces a racemic form of compound VI. Thus, if a racemic $\alpha,\beta$-dihalogenopropionic acid ester is reacted with 6-methyl-3-hydroxy-2-mercaptopyridine, the product will be the racemic form of CoU. However, due to the amphoteric properties of the compounds of Formula VI, resolution can be effected by formation of a salt with an optically active acid or base and fractional crystallisation, etc., may be used to effect a separation of the enantiomorphs. Brucine has been used to resolve racemic CoU.

The process according to the invention for the production of compounds of Formula VI will now be described in greater detail in relation to a preferred method of synthesis of CoU.

2-methyl-5-hydroxy-pyridine, which may be prepared by fusion of 2-methyl-pyridine-5-sulphonic acid with KOH, is reacted with bromine in dry pyridine, or an equivalent reagent to give 6-methyl-3-hydroxy-2-bromopyridine, which is then reacted with an alkali metal hydrosulphide to produce 6-methyl-3-hydroxy-2-mercaptopyridine. The latter is then reacted with a 2,3-dibromo-propionic acid ester in the presence of a base, preferably alkali metal alkoxide to give racemic methyl CoU; the ester can subsequently be readily hydrolysed to CoU. To produce L-CoU, the natural form, the racemic acid may be resolved by fractional crystallisation of a salt with an optically active base such as brucine.

The bicyclic compounds of the Formula VI may be readily substituted at the 7-position by reaction with an electrophilic reagent to replace the 7-hydrogen by residue of said agent.

According to a further feature of the invention we provide a process for the preparation of compounds of the formula

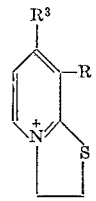

IX (in which R is as defined above and $R^3$ is the residue of an electrophilic reagent) thereof, comprising reaction of a compound of Formula VI (as defined above) with an electrophilic reagent. Thus the 7-bromo compound is obtained by reaction with molecular bromine in acetic acid in the presence of potassium acetate, or with bromine in ethanol. Reaction with aqueous sodium iododichloride gives the 7-iodo compound and heating with chlorosulphonic acid gives the 7-chloro compound. Similarly nitration with concentrated nitric acid in acetic acid-sulphuric acid gives the 7-nitro compound.

The 7-halogeno compounds thus formed may in a further feature of the invention be substituted to give a thiol, thioether or organic disulphide, which thiol or thio ether may in turn be oxidised to give a sulphonic acid or sulphoxide.

The compounds of Formula IX are new compounds and constitute a further feature of the present invention.

In order that the invention may be well understood we give the following examples by way of illustration only: all temperatures are in ° C.:

EXAMPLE 1

2-bromo-3-hydroxy-6-methylpyridine 2-methylpyridine-5-sulphonic acid was prepared by sulphonation of α-picoline by the method of S. M. McElvain and M. A. Goose (J. Am. Chem. Soc., 65, 2233 (1943)).

5-hydroxy-2-methylpyridine was then prepared by fusion of 2-methylpyridine-5-sulphonic acid with potassium hydroxide by the method of L. Marion and W. F. Cockbrien, (J. Am. Chem. Soc., 73, 3402 (1949)).

5-hydroxy-2-methylpyridine (4.4 g., 0.04 mole) was dissolved in dry pyridine (80 ml.) and a solution of bromine (7.05 g., 0.044 mole) in dry pyridine (40 ml.) added dropwise over 10 minutes to the stirred solution at room temperature. The reaction mixture was stirred for another hour at room temperature, evaporated in vacuo, the residue triturated with water (30 ml.), the white-grey solid filtered off, washed with water and dried; yield: 5.5 g. (74%). White crystals from ethanol, M.P. 187–190°.

$\nu_{max}^{KBr}$ 3000–25000, 1550, 1490, 1290, 1210, 1130, 1080, 830, 780 and 670 cm.$^{-1}$ U.V. absorption in 0.1 N NaOH: $\lambda_{max.}$ at 242 and 312 m$\mu$. In 0.1 N HCl: $\lambda_{max.}$ at 305 m$\mu$.

(Found (percent): C, 38.44; H, 3.10; Br, 42.58; N, 7.47. Calcd. for $C_6H_6BrNO$ (percent): C, 38.42; H, 3.22; Br, 42.50; N, 7.45).

The p.m.r. spectrum in trifluoracetic acid (TFA) has peaks at 7.20 (3H, singlet, aryl-CH), 1.97 and 2.41λ (2H, AB, J=8.6 c./sec., —CH=CH—). Thin layer chromatography on Ecteola ion-exchange cellulose in 4% aqueous NaCl: $R_f$=0.4.

EXAMPLE 2

3-hydroxy-2-mercapto-6-methylpyridine

Potassium hydrogen sulphide (15 g.) was added to dry propylene glycol (250 ml.) and the stirred mixture heated to boiling when the solid dissolved. The temperature was lowered to 160° and 6-bromo-5-hydroxy-2-methylpyridine (12 g., 0.064 mole) added in small portions over 15 minutes. The greenish solution was stirred under reflux for 20 hours and the glycol removed at reduced pressure at 100°. The residue was dissolved in water (150 ml.), treated with charcoal, and the solution slowly acidified with 50% acetic acid (30 ml.). After standing in the cold overnight the yellow solid (7.3 g., 82%), M.P. 170–175°, was collected and recrystallised from ethanol, M.P. 174–177°

$\nu_{max}^{KBr}$ 3400, 3200–2940, 1600, 1510, 1400, 1260, 1220, 1100, 900 and 820 cm.$^{-1}$ U.V. absorption in 01 N NaOH: $\lambda_{max}$. at 270 and 370 m$\mu$. In 0.1 N HCl: $\lambda_{max}$. at 260 and 360 m$\mu$.

The p.m.r. spectrum in TFA had peaks at 7.33 (3H, singlet, aryl-CH$_3$), 2.68 and 2.24$\lambda$ (2H, AB, J=8.4 c./sec., —CH=CH—). TLC on Ecteola ion-exchange cellulose in 4% aqueous NaCl: R$_f$=0.9.

(Found (percent): C, 51.07; H, 5.00; N, 9.93; S, 22.73. Calcd. for C$_6$H$_7$OS (percent): C, 51.09; H, 5.14; N, 9.91; S, 22.61).

EXAMPLE 3

2,4-dibromo-3-hydroxy-6-methylpyridine

Bromine (35.4 g., 0.22 mole) in pyridine (200 ml.) was added dropwise over 30 minutes to a stirred solution of 5-hydroxy-2-methylpyridine (11.0 g., 0.1 mole) in pyridine (300 ml.) at room temperature. The temperature in the reaction mixture rose to 40 during the bromine addition. After being allowed to stand overnight at room temperature the precipitated pyridine hydrobromide was removed by filtration, the filtrate concentrated to about 150 ml. and more pyridine hydrobromide removed. The filtrate was evaporated to dryness, the reddish brown residue dissolved in ethanol (50 ml.) and conc. HCl. (20 ml.) added. On standing in the cold the dibromo derivative slowly crystallised out. Some coprecipitated pyridine salt was removed by trituration with water. There remained 21.5 g. (80%) of the desired substance, M.P. 102–6. This material could be further purified by sublimation or recrystallisation from ligroin. The analytical sample melted at 107–109°. (Found (percent): C, 27.00; H, 1.86; N, 5.31; Br, 60.34. Calcd. for C$_6$H$_5$Br$_2$NO (percent): C, 27.00; H, 1.90; N, 5.25; Br, 59.87.)

EXAMPLE 4

3-hydroxy-2-iodo-6-methylpyridine

Aqueous 3.5 N sodium iododichloride (15.7 ml.) was added dropwise to pyridine (50 ml.) with stirring at room temperature. The resultant suspension was added portionwise over 30 minutes to a stirred solution of 5-hydroxy-2-methylpyridine (5.5 g., 0.05 mole) dissolved in pyridine (150 ml.). After standing at room temperature overnight the solution was decolourized by dropwise addition of aqueous 2% sodium pyrosulphite solution at room temperature. The solution was then evaporated to dryness at reduced pressure, the residue suspended in water (30 ml.) and hydrochloric acid (10 ml.) added. The white crystalline solid formed (6.2 g. 53%), M.P. 173°, had M.P. 174° (subl.) after recrystallisation from ethanol. TLC on Ecteola ion-exchange cellulose in 1% aqueous NaCl: R$_f$=0.37–0.4.

Paper chromatography. (Found (percent): C, 30.39; H, 2.42; N, 6.23. Calcd. for C$_6$H$_6$INO (percent): C, 30.66; H, 2.57; N, 5.96.)

EXAMPLE 5

3,3'-dihydroxy-6,6'-dimethyl-2,2'-dipyridyldisulphide

Bromine (32 g. 0.2 mole) dissolved in ethyl acetate (460 ml.) was added dropwise (90 minutes) to a stirred solution of 3-hydroxy-6-methylpyrid-2-thione (28.2 g., 0.2 mole) in ethyl acetate (900 ml.) in the cold. The solid formed (49.3 g.) melted at 235–37° after recrystallisation from ethanol. The free base was obtained by dissolving the hydrobromide (39 g.) in water (800 ml.) and neutralizing with sodium bicarbonate; white solid (14.3 g. 58%), M.P. 207°. An analytical sample recrystallised from ethanol had M.P. 209–10°. (Found (percent): C, 51.37; H, 4.57; N, 9.97; S, 21.97. Calcd. for C$_{12}$H$_{12}$N$_2$O$_2$S$_2$ (percent): C, 51.40; H, 4.31; N, 9.98; S, 22.28.)

EXAMPLE 6

3-hydroxypyrid-2-thione

Potassium hydrogen sulphide (18 g., 0.25 mole) was dissolved in propylene glycol (250 ml.) by heating to 160. The temperature of the green solution was lowered to 90° and 2-bromo-3-hydroxypridine (17.4 g. 0.10 mole) added in small portions over 15 minutes. The mixture was stirred at 120° for 24 hours, evaporated to dryness at reduced pressure, the residue dissolved in water (40 ml.), pH~10, and the solution acidified with 50% acetic acid (pH~5) when the yellow solid (10.2 g., 80%) precipitated out; recrystallized from ethanol, M.P. 144–45.

EXAMPLE 7

2-bromo-1,6-dimethyl-3-hydroxypyridinium iodide 2-bromo-3-hydroxy-6-methylpyridine (54.6 g., 0.3 mole) was dissolved in dry DMF (250 ml.) and methyl iodide (57.0 g., 0.4 mole) was added. The solution, in a thick walled sealed 500 ml. flask, was heated in an oil bath at 70° for 2 days. The precipitated solid was removed by filtration, washed well with methanol yielding the desired product (73 g. 74%; M.P. 231–233°), which was used directly in succeeding syntheses without further purification. An analytical sample recrystallized from water had M.P. 234–235°. (Found (percent): N, 4.34. Calcd. for C$_7$H$_9$BrINO: 4.24.)

A similar synthesis in methanol instead of DMF with 3 equivalents of methyl iodide furnished 64% of the desired product.

EXAMPLE 8

2-bromo-1-ethyl-3-hydroxy-6-methylpyridinium iodide

A solution of 2-bromo-3-hydroxy-6-methylpyridine (18.8 g., 0.1 mole) and ethyl iodide (23.5 g., 0.15 mole) in dry DMF (120 ml.) was heated in a pressure bottle (500 ml.) at 90° for 48 hours. More ethyl iodide (15.6 g., 0.1 mole) was added and the heating resumed for another 24 hours. The solution was then evaporated to dryness and the residue dissolved in ethanol (20 ml.). A greyish-brown solid (9.2 g., 27%) crystallized out, M.P. 182–185°. Recrystallization twice from methanol (charcoal treatment) gave the white crystalline pyridinium salt, M.P. 187–192°.

EXAMPLE 9

1,6-dimethyl-3-hydroxyprid-2-thione 2-bromo-1,6-dimethyl-3-hydroxypyridinium iodide (25 g., 0.075 mole) was added in small portions to a stirred solution of potassium hydrogen sulphide (13.5 g., 0.19 mole) in dry DMF (500 ml.) at 80°. After 1 hour the DMF was distilled off at reduced pressure at about 80°. The residual brown solid was triturated with water (100 ml.) and the pH brought to 6.5 with acetic acid. The pale grey solid, after being filtered, washed and dried weighed 10.9 g. (94%), M.P. 140–150° (with sublimation occurring from 110°). This substance was chromatographically homogeneous. An analytical sample, recrystillized twice from methanol, melted at 151–154° with sublimation occurring from 105°. (Found (percent): C, 53.70; H, 5.72; N, 9.01. Calcd. for $C_7H_9NOS$ (percent): C, 54.17; H, 5.84; N, 9.02).

EXAMPLE 10

3-hydroxy-6-methyl-2-methylthiopyridine

Methyl iodide (25.5 g. 0.18 mole) was added dropwise (15–20 min.) at room temperature to a vigorously stirred solution of 3-hydroxy-6-methylpyrid-2-thione (21.5 g. 0.15 mole) in a 1 N NaOH aq. (180 ml. 0.18 mole). After stirring for 2 hours the pH of the resultant suspension (pH 10.2) was adjusted to 8.5 with dilute HCl and the solid filtered off; yield 21.0 g. (90%). For analysis the product was further purified by vacuum sublimation or by recrystallization from water; M.P. 127–29° (subl.). (Found (percent): C, 53.80; H, 5.69; N, 8.96; S, 20.80. Calcd. for $C_7H_9NOS$ (percent): C, 54.18; H, 5.84; N, 9.03; S, 20.65).

EXAMPLE 11

2-ethylthio-3-hydroxy-6-methylpyridine (a) Ethyliodide (117 g., 0.75 mole) was added dropwise over 15 minutes to a stirred solution of 3-hydroxy-6-methylpyrid-2-thione (70.6 g., 0.5 mole) in 1 N NaOH aq. (750 ml., 0.75 mole) at 40°. The reaction was kept at 40° for another 2 hours and allowed to stand at room temperature overnight. The pH was then adjusted to 5.3 with dilute HCl and the oily suspension extracted with ether. The ether extract (in all 750 ml.) was washed with water, dried, evaporated and the residual oil distilled to furnish a yellowish oil, B.P. 120–130°/0.05 mm., 66.1 g. (72%) which crystallised on cooling. Recrystallisation from light petrol (B.P. 60°) gave white crystals, M.P. 47–49°.

(b) A solution of ethyl iodide (3.44 g., 0.022 mole) and 3-hydroxy-6-methylpyrid-2-thione (2.82 g., 0.02 mole) in dry benzene (75 ml.) was refluxed for 48 hours. A reddish-brown oil separated gradually from the solution. After cooling, the benzene layer was decanted, the semisolid dried in vacuo, dissolved in water (50 ml.) at 70°, the solution treated with a little charcoal, and finally concentrated to about 10 ml. when the hydroiodide crystallized out (2.55 g., 43%), M.P. 124–128°. Further recrystallization from acetic acid gave M.P. 126–128°. (Found (percent): C, 32.35; H, 4.11; N, 4.83; S, 10.68. Calcd. for $C_8H_{11}NOS.HI$ (percent): C, 32.32; H, 4.07; N, 4.71; S, 10.79).

The free base was generated by dissolution in water and neutralization with sodium hydroxide and found to be identical with that prepared in aqueous NaOH.

EXAMPLE 12

2-β-hydroxyethylthio-3-hydroxy-6-methylpyridine (a) Ethylene bromohydrin (56.3 g., 0.45 mole) was added dropwise over 20 minutes at 40° to a vigorously stirred solution of 3-hydroxy-6-methylpyrid-2-thione (42.3 g., 0.3 mole) in 1 N NaOH aq. (450 ml., 0.45 mole). The solution was kept at 40° for another 2 hours, then allowed to stand at room temperature overnight. A little semisolid precipitate formed was removed by filtration and the pH of the filtrate adjusted to 7.6. The yellowish oil formed was extracted into ether and the extracts washed, dried and evaporated leaving the desired substance (44.8 g., 81%), M.P. 92–100°. Recrystallization from water gave white crystals, M.P. 102–104°. (Found (percent): C, 51.87; H, 5.99; N, 7.56; S, 17.31. Calcd. for $C_8H_{11}NO_2S$ (percent): C, 5152; H, 6.07; N, 5.77; S, 17.18). In a similar experiment with ethylene chlorohydrin the yield was 94%.

(b) A solution of ethylene chlorhydrin (2.35 g., 0.03 mole) and 3-hydroxy-6-methylpyrid-2-thione (2.82 g., 0.02 mole) in dry toluene (50 ml.) was refluxed for 48 hours. The solid precipitate formed was filtered from the hot solution; yield 1.9 g. (43%); M.P. 122–134°. The hydrochloride thus obtained could be recrystallized from water or ethanol M.P. 135–141°.

The free base was obtained by neutralization of an aqueous solution with sodium hydroxide.

EXAMPLE 13

2-carboxymethylthio-3-hydroxy-6-methyl-pyridinium bromide

Bromoacetic acid (16.6 g., 0.12 mole), dissolved in 50 ml. dry chlorobenzene was added dropwise over 1 hour at 132° to a vigorously stirred solution of 3-hydroxy-6-methylpyrid-2-thione (11.0 g., 0.088 mole) in 250 ml. dry chlorobenzene. A pale yellow solid precipitated gradually during the addition. The solution was refluxed for another 2 hours under dry conditions, then allowed to stand at room temperature overnight. The precipitate was removed by filtration: 21 g. crude product (94% yield), M.P. 148–165° C. The hydrobromide thus obtained could be recrystallized from hot glacial acetic acid. An analytical sample had M.P. 168–170° C. (Found (percent): C, 34.55; H, 3.67; N, 5.12. Calcd. for $C_8H_9NO_3S.HBr$ (percent): C, 34.31; H, 3.60; N, 5.00).

EXAMPLE 14

2-α-carboxyethylthio-3-hydroxy-6-methylpyridine

A solution of α-bromopropionic acid (9.18 g. 0.06 mole) and 3-hydroxy-6-methylpyrid-2-thione (5.64 g. 0.04 mole) in dry toluene (150 ml.) was refluxed for 6 hours. The toluene was decanted from the cold reaction mixture and the residual oil crystallized from acetic acid (8.7 g.~100%), M.P. 140–143°.

EXAMPLE 15

2-carboxymethylthio-1,6-dimethylpyridinium-3-oxide

The disodium salt of mercapto acetic acid was prepared by adding 2 N methanolic sodium methoxide (50 ml., 0.1 mole) to an ethanolic (20 ml.) solution of mercapto acetic acid (4.6 g., 0.05 mole). Another solution was prepared by adding 2-bromo-1,6-dimethyl-3-hydroxypyridinum iodide (16.5 g. 0.05 mole) to dry ethanol (670 ml.) and then 2 N methanolic sodium methoxide (22.5 ml., 0.045 mole). The first solution was added dropwise with stirring to the pyridinium solution and the mixture refluxed for 6 hours. The reaction mixture was then evaporated, the residual material dissolved in water (70 ml.) and the pH adjusted to 4.0 with 2 N HCl when the desired compound was precipitated mainly as the hydriodide (7.5 g. 34%), the hydriodic acid obviously coming from the sodium iodide when treated with HCl.

The free base was obtained by dissolving the hydiodide salt (1.0 g.) in water (100 ml.), adjusting the pH to 5.0 and extracting with 90% phenol (3 x 20 ml.). The phenol extracts were washed several times with water until the washings were free from halide ions. Then phenol was then diluted with ether (120 ml.) when a water layer formed. The water phase was separated and the phenol layer extracted with water (3 x 25 ml.). The combined water layer and extracts were washed with ether (3 x 20 ml.) to remove any phenol and then lyophilized to yield the desired solid (0.69 g.) which after recrystallisation from ethanol had M.P. 179–180°. (Found (percent): C, 50.89; H, 5.32; N, 6.63; S, 15.40. Calcd. for $C_9H_{11}NO_3S$ (percent): C, 50.69; H, 5.20; N, 6.57; S 15.03.)

EXAMPLE 16

2-carbethoxymethylthio-1,6-dimethylpyridinium-3-oxide

The sodium salt of ethyl mercapto acetic acid was prepared by dissolving ethyl mercaptoacetic acid (6.0 g. 0.05 mole) in dry methanol (15 ml.) and adding 2 N methanolic sodium methoxide (25 ml., 0.05 mole). 2-bromo - 1,6 - dimethyl-3-hydroxypyridinium iodide (16.5 g., 0.05 mole) was suspended in dry methanol (500 ml.) and 2 N methanolic sodium methoxide (22.5 ml., 0.045 mole) was added dropwise when a clear solution resulted. The mercapto acetate solution was then added dropwise with stirring over 20 minutes and the reaction mixture refluxed for 6 hours. The yellow solid remaining after evaporation was dissolved in water (70 ml., pH 7.2) and the pH brought to 4.8 with dilute HCl, when the desired product was precipitated. Concentration of the filtrate gave a second crop. Total yield: 11.9 g. (63%), M.P. 136–140°. A sample recrystallized from ethanol had M.P. 142–143°. This ester was very readily hydrolysed to the corresponding acid.

EXAMPLE 17

1,6-dimethyl-2-(benzimidazol-2-ylthio) pyridinium-3-oxide 2.2 N methanolic sodium methoxide (17 ml., 0.039 mole) was added to 2-bromo-1,6-dimethyl-3-hydropyridinium iodide (13.6 g., 0.043 mole) in dry methanol (200 ml.). Similarly, 2.2 N methanolic sodium methoxide (19 ml., 0.043 mole) was added to 2-mercaptobenzimidazole (6.19 g., 0.043 mole) in methanol (50 ml.). The benzimidazole solution was then added dropwise (30 minutes) with stirring to the boiling solution first prepared. The reaction mixture was then refluxed for 5 hours and the yellow solid formed (9.2 g., 82%) filtered from the cooled (35–40°) solution, M.P. 239–240 (dec.). An analytical sample recrystallized from ethanol had M.P. 252–253°. (Found (percent): C, 61.81; H, 5.12; N, 15.41; S, 11.82. Calcd. for $C_{14}H_{13}N_3OS$ (percent): C, 61.97; H, 4.83; N, 15.49; S, 11.81.)

EXAMPLE 18

1,6-dimethyl-2-ethylthio-3-hydroxypyridinium iodide (a) 2.4 N sodium methoxide (28.7 ml., 0.066 mole) was added to a solution of 1,6-dimethyl-3-hydroxypyrid-2-thione (8.55 g., 0.055 mole). To the resultant solution was added ethyl iodide (10.3 g., 0.066 mole) and the solution refluxed for 3 hours when more ethyl iodide (1.0 g., 0.0064 mole) was added and the heating continued for another hour. The methanol was then evaporated, the residue dissolved in water (25 ml.) and the pH adjusted to 1 with hydrochloric acid. The hydroiodide (12.4 g., 73%) slowly crystallized out, M.P. 180–181°. Recrystallization from water gave M.P. 184–186°. (Found (percent): C, 34.79; H, 4.43; N, 4.71. Calcd. for $C_9H_{13}NOS \cdot HI$ (percent): C, 37.73; H, 4.53; N, 4.50.)

(b) A solution of 2-ethylthio-3-hydroxy-6-methylpyridine (22 g., 0.13 mole) in methyl iodide (100 ml.) was refluxed for 44 hours. The precipitated solid (22.1 g.) was found chromatographically to consist of two compounds in the ratio 3:2, the major product being the desired compound. The minor product being 1,6-dimethyl-3-hydroxy-2-methylthiopyridinium iodide was isolated after three recrystallisations from ethanol, M.P. 190–93°. (Found (percent): C, 32.48; H, 4.20; N, 4.80. Calcd. for $C_8H_{11}NOS \cdot HI$ (percent): C, 32.44; H, 4.08; N, 4.73.)

EXAMPLE 19

1-carboxymethyl-2-methylthio-6-methylpyridinium-3-oxide

Methanolic sodium methoxide (72 ml., 0.16 mole) was added to a solution of 3-hydroxy-2-methylthio-6-methylpyridine (22.4 g., 0.144 mole) and ethyl iodoacetate (34.2 g., 0.16 mole) in dry ethanol (600 ml.) and the solution refluxed for 50 hours. The reaction mixture was then evaporated to dryness, the residue extracted with boiling ethyl acetate (5 x 40 ml.) and the ethyl acetate extracts evaporated leaving the ethyl ester as an oily material. This was hydrolysed to the desired acid by heating in N HCl aq. (200 ml.) for 1 hour. The pH of the cold solution was adjusted to 7 with 6 N NaOH aq., and unreacted thioether removed by ether extractions. The pH was then adjusted to 3.4 and the solution slowly concentrated when the hydrochloride of the desired product was precipitated, in all 26.6 g. (75%). Trace impurities were removed by crystallizing the sodium salt. Thus the hydrochloride (10 g.) was dissolved in water (60 ml.) and the pH adjusted to 7 by addition of 6 N NaOH aq. The solution was then slowly concentrated in vacuo until the first crystals appeared. The white crystalline sodium salt precipitated on standing. M.P. 246–7°. The analytical sample after recrystallization from water had M.P. 252–253°. (Found (percent): C, 45.89; H, 4.13; N, 6.38; S, 13.37. Calcd. for $C_9H_{10}NO_3SNa$ (percent): C, 45.94; H, 4.28; N, 5.96; S, 13.63.)

The zwitterion was generated by ion-exchange. Thus an aqueous solution of the hydrochloride (2 g.) was passed through a column of IR-120 (50 ml.) in the cation form and the column washed until the eluate was free of halide ions. The compound was then eluted with 1 N $NH_4OH$ aq. (400 ml.). Freeze drying of the eluate yielded the ammonium salt which was redissolved in water (100 ml.) and applied to another column of DEAE-Sephadex O-25 (40 ml.) previously treated with aqueous formic acid. Elution with 1 N formic acid in water (200 ml.) and freeze-drying yields the zwitterion (1.3 g.), M.P. 96°. An analytical sample recrystallized from water had M.P. 96–97°. (Found (percent): C, 50.67; H, 5.21; N, 6.93; S, 15.91. Calvd. for $C_9H_{11}NO_3S$ (percent): C, 50.69; H, 5.20; N, 6.57; S, 15.03.)

The quaternisation can also be carried out by heating together the iodoacetate and the pyridine in such solvents as d.m.f. at 80° or in refluxing chlorobenzene, but the reaction is slow. When bromoacetate is used, the reaction proceeds much slower but even then yields some of the desired product.

EXAMPLE 20

3-hydroxy-6-methylpyridine-2-sulphonic acid

30% hydrogen peroxide (37 ml., 0.33 mole) was added to a solution of 3-hydroxy-6-methylpyrid-2-thione (14.1 g., 0.1 mole) in formic acid (350 ml.). The solution was left at room temperature overnight, evaporated and the residue dissolved in water (100 ml.). A white crystalline precipitate formed (14.6 g., 77%), M.P. 273–81°. An analytical sample recrystallised twice from water melted at 281–86°. (Found (percent): C, 38.27; H, 3.93; N, 7.17; S, 16.84. Calcd. for $C_6H_7NO_4S$ (percent): C, 38.09; H, 3.73; N, 7.40; S, 16.94.)

EXAMPLE 21

2-ethylthio-3-hydroxy-6-methylpyridine S-oxide as hydrochloride

30% hydrogen peroxide (22 ml., 0.195 mole) was added at room temperature to a solution of 2-ethylthio-3-hydroxy-6-methylpyridine (22.0 g., 0.13 mole) in formic acid (350 ml.). The solution was left at room temperature overnight, evaporated at 30–35° at reduced pressure, the residual material dissolved in water (30 ml.) and conc. HCl (18 ml.) added; white crystalline material (8.5 g.), M.P. 107–15° (dec.). The filtrate was concentrated to 10 ml. and acetone (20 ml.) added giving a white crystalline material (12.2 g.), M.P. 102–122° (dec.). Total yield 20.7 g. (71%). Recrystallisation from acetic acid gave M.P. 120–22°. (Found (percent): H, 5.19; N, 6.46. Calcd. for $C_8H_{11}NO_2S \cdot HCl$ (percent): H, 5.45; N, 6.32.)

EXAMPLE 22

1,6-dimethyl-3-hydroxy-pyridinium-2-sulphonate

30% hydrogen peroxide solution (40 ml., 0.40 mole) was added to a solution of 1,6-dimethyl-3-hydroxpyrid-2-thione (15.6 g., 0.10 mole) dissolved in formic acid (1000 ml.). The temperature in the solution rose to 60°. Paper chromatography (BuOH:EtOH:NH$_3$:H$_2$O–4:1:2:1) of the solution after standing overnight at room temperature showed two blue fluorescent spots indicated the component ratio to be 3:2 (R$_f$=0.2 and 0.5 respectively). The solution was evaporated at 50° at reduced pressure, the residual oil dried in vacuo when it solidified to a white substance. This material was suspended (stirring) in water (40 ml.) and left in the cold for 20 hours. The crystalline solid (7.6 y., 37%) was then collected, M.P. 185–89°. Chromatovrapry showed this to be the practically pure component with R$_f$=0.2. Recrystallising twice from ethanol did not change the M.P. (Found (percent): C, 41.57; H, 4.34; N, 7.04. Calcd. for C$_7$H$_9$NO$_4$S (percent): C, 41.37; H, 4.46; N, 6.89.)

This substance can be identified as 1,6-dimethyl-3-hydroxy-pyridinium-2-sulphonate.

EXAMPLE 23

5-methyl-dihydrothiazolo[3,2-a]pyridinium-8-oxide (CoU')

(a) 3-hydroxy-6-methylpyprid-2-thione (1.42 g., 0.01 mole) was added to absolute ethanol and a 2.7 N methanolic sodium methoxide solution (8.15 ml. 0.022 mole) added. To this solution at room temperature was added dropwise 1,2-dibromoethane (2.07 g., 0.011 mole). The solution was stirred at room temperature for 20 hours. In another experiment the alkylation was run at 60° and was then complete after 6 hours.

After evaporation of the solvent the residue was extrated with boiling isopropanol (2 x 30 ml.) and the extracts again evaporated to dryness. The residue was redissolved in boiling ethanol, a little undissolved material filtered off, and the filtrate concentrated to the point of crystallisation. After standing in the cold the white crystalline material (0.91 g.), M.P. 202–5°, was collected. Further concentration of the filtrate furnished another crop (0.82 g.); (total yield hydrated material =90%). Further recrystallisation from methanolic or ethanolic acetone gave M.P. 220° (dec.). (Found (percent): C, 57.73; H, 5.37; N, 8.42; S, 19.07. Calcd. for C$_8$H$_9$NOS (percent): C, 57.46; H, 5.43; N, 8.37; S, 19.17.)

(b) As hydrobromide: 3-hydroxy-6-methylpyrid-2-thione (3.0 g., 0.021 mole) was dissolved in boiling benzene (50 ml.) and 1,2-dibromoethane (4.8 g., 0.026 mole) added. The resulting solution was refluxed overnight, allowed to cool and the white crystalline material filtered off (4.0 g., 51%) and recrystallised from methanol. This substance started to sublime at 290° and decomposed above 300°. Treatment of this material with alkali furnished the free base identical with that under (a).

EXAMPLE 24

Dihydrothiazolo[3,2-a]pyridinium-8-oxide

To 3-hydroxypyrid-2-thione (20 g., 0.16 mole) in methanol (150 ml.) was added a solution of sodium methoxide (13.0 g., 0.24 mole). To the resultant solution was added dropwise with stirring at 0° 1,2-dibromoethane (31.0 g., 0.16 mole). The reaction mixture was then stirred for 2 days at room temperature, evaporated and the residue extracted with boiling isopropanol (3 x 300 ml.). The insoluble salt was discarded, the isopropanol evaporated, the residue dissolved in water (400 ml.), the pH adjusted to 7 and the solution extracted with ether (3 x 150 ml.) to remove unreacted thiolactam. Slow concentration of the solution (brought to pH 4 with HCl) precipitated the hydrochloride (22.0 g., 62%). Part of this material (15.0 g.) being contaminated with a little unreacted thione, was dissolved in water (200 ml.), the pH adjusted to 7.4 and the solution extracted with ethyl acetate (3 x 75 ml.), the solution treated with a little charcoal, the pH adjusted to about 3 with HCl and the solution concentrated to about 50 ml. when the white pure hydrochloride (12 g.) crystallised out. The free base was obtained by dissolving the hydrochloride in water, adding one equivalent of sodium hydroxide, evaporating the solution, drying and extracting the organic moiety into boiling isopropanol; white crystals, M.P. 150–158° (dec.). (Found (percent): N, 6.53. Calcd. for C$_7$H$_7$NOS·H$_2$O·HCl (percent): N, 6.74).

EXAMPLE 25

8-hydroxy-5-methyl-dihydroxythiazolo[3,2-a]pyridinium-3-carboxylate (CoU)

(a) 3-hydroxy-6-methylpyrid-2-thione (1.42 g., 0.01 mole) was added to absolute ethanol (50 ml.) and 2.7 N methanolic sodium methoxide solution (8.15 ml., 0.022 mole) added. To the resultant stirred solution at room temperature was added dropwise methyl 2,3-dibromo-propionate (2.86 g., 0.016 mole). The reaction mixture was stirred at room temperature for 20 hours although chromatography showed that alkylation to be very fast. The solvent was then removed at reduced pressure and the residue dissolved in water (50 ml.), hydrochloric acid (10 ml.) added and the solution heated at 90° for 1 hour. The pH was then adjusted to 4 with dilute sodium hydroxide and the precipitated material (0.5 g.) removed by filtration. Chromatography showed this to be a mixture of CoU and other products. The filtrate was concentrated to about 25 ml. and left in the cold. White crystals slowly appeared (0.90 g., 41%), M.P. 170–172°. One further recrystallisation from water gave M.P. 160–162° which remained constant on further recrystallisations. (Found (percent): S, 15.53. Calcd. for C$_9$H$_9$NO$_3$S (percent): S, 15.18.)

NMR spectrum in TFA: Peaks at 7.27 (3H, singlet, aryl-CH$_3$), 5.81 (2H, doublet, J=4.5 c./sec., CH$_2$ next to asymmetric centre) 3.77 (1H, quartet, J=4.5 c./sec., asymmetric CH), 2.68 and 2.30τ (2H,AB,J=8.5 c./sec., —CH=CH—).

When this solution was mixed with an equally strong solution of CoU obtained from liver exactly the same p.m.r. spectrum was obtained providing the identity of the synthetic and neutral materials.

Paper chromatography: R$_f$=0.19–0.24 in

BuOH:EtOH:NH$_3$:H$_2$O (4:1:2:1). R$_f$=0.53–0.58 in BuOH:HOAc:H$_2$O (100:22:50).

EXAMPLE 26

CoU from α-bromoacrylic acid

To a solution of 3-hydroxy-2-mercapto-6-methyl-pyridine (4.23 g., 0.03 mole) in ethyl acetate (130 ml.) was added dropwise over 30 minutes with vigorous stirring at room temperature a solution of α-bromoacrylic acid (6.8 g., 0.045 mole) in ethyl acetate (25 ml.). CoU-hydrobromide started precipitating out at once. The mixture was stirred for 24 hours and the solid (7.1 g.) was collected and the filtrate concentrated to about 35 ml. and on standing in the cold the liquors gave another crop (1.8 g.). Total yield 8.9 g. (theoretical yield), M.P.>300°. For further purification this material was dissolved in water at pH 7 by the addition of a little dilute sodium hydroxide. Adjustment of the pH of the slightly warm solution to 3.8 with dilute hydrochloric acid precipitated the trace of unchanged thiol present. Chromatographically pure CoU crystallised out from the cold solution in 83% yield, M.P. 158–159°. A further recrystallisation from water gave M.P. 160°.

EXAMPLE 27

8-hydroxy-dihydrothiazolo- [3,2-a]-pyridinium-3-carboxylate 3-hydroxypyrid-2-thione (19 g. 0.133 mole) was dissolved in ethyl acetate (200 ml.). A solution of α-bromoacrylic acid (23 g.) in ethyl acetate (200 ml.) was added dropwise at room temperature. The reaction mixture was stirred for 2 days, and left at −20° when 17 g. of a solid could be collected. This was extracted in boiling water (400 ml.), the pH adjusted to ~5, insoluble thione filtered off, the hot filtrate treated a little with charcoal, filtered and left at 0° overnight. The solid precipiate (9 g.) was collected, dried and extracted with boiling methanol (50 ml.) for 15 minutes, and the desired insoluble product (8 g., 27%) filtered off, M.P. 180° (dec.).

EXAMPLE 28

8-hydroxy-5-methyl-dihydrothiazolo[3,2-a]pyridinium-2-carboxylate (IsoCoU)

(a) 3-hydroxy-6-methylpyrid-2-thione (5.0 g. 0.036 mole) was dissolved in benzene (180 ml.) and about 30 ml. of the solution distilled off to remove any water present. To the final solution was added p-nitrophenol (0.5 g.), and methyl 2,3-dibromopropionate (15 g., 0.061 mole) dissolved in benzene (20 ml.) added dropwise over 1 hour to the refluxing solution. After being heated under reflux for 60 hours the solid precipitate was collected by filtration, weight 81 g. This material was dissolved in water (200 ml.), some insoluble material removed by filtration and aqueous 2 N NaOH (20 ml., 0.04 mole) added dropwise over 1 hour at 60°. After stirring at 60° overnight the solution had pH 6. The cold solution was extracted with ether until colourless to remove p-nitrophenol and trace of unchanged thiol. The solution was then concentrated to the point of crystallisation and left in the cold. The yield was 3.0 g. of the white crystalline iso-CoU. Further concentration of the filtrate furnished another 0.26 g. of the same material, i.e., total yield 3.26 g. Recrystallisation from acetic acid gave unsharp M.P. 270° (dec.). (Found (percent): C, 47.57; H, 4.75; N, 6.28. Calcd. for $C_9H_9NO_3S \cdot H_2O$ (percent): C, 47.15; H, 4.84; N, 6.11.)

(b) Iso-CoU from 2,3-dibromopropionic acid.—3-hydroxy-2-mercapto-6-methylpyridine (1.4 g., 0.01 mole) was dissolved in methanolic (10 ml. sodium methoxide (from 0.46 g. of Na, 0.02 M) and 2.3-dibromo-propionic acid (2.3 g., 0.01 M) added. The solution was left at room temperature for 2 days and then cooled at 0° when iso-CoU (0.43 g.) crystallised out. Recrystallisation from water gave M.P. about 263° (dec.). All physical data were identical with those of iso-CoU prepared by other methods.

EXAMPLE 29

8-hydroxy-dihydrothiazolo[3,2-a]pyridinium-2-carboxylate

To a solution of 3-hydroxypyrid-2-thione (13 g.) in benzene (200 ml.) and methanol (100 ml.) was added methyl 2,3-dibromopropionate (26 g.) and p-nitrophenol (0.5 g.). The solution was refluxed for 2 days, evaporated to dryness and the residue dissolved in water (300 ml.) by addition of dilute NaOH to pH 11 and allowed to stand overnight. The pH was then brought to 7, unreacted solid thione filtered off and the filtrate extracted with ethyl acetate (3 x 100 ml.). The aqueous phase was decolorised with charcoal and evaporated to dryness. The residue was extracted with hot methanol, the methanol extracts evaporated and the residue dissolved in boiling water (175 ml.), white crystalline material precipitated on cooling. (5 g., 36%); M.P. 250° (dec.). (Found (percent): C, 47.98; H, 3.92; N, 7.43; S, 15.86. Calcd. for $C_8H_7NO_3S \cdot \frac{1}{2}H_2O$ (percent): C, 48.35; H, 4.56; N, 7.05; S, 16.14.)

EXAMPLE 30

Methyl ester of 8-hydroxy-5-methyl-dihydrothiazolo[3,2-a]pyridinium-2-carboxylate as hydrobromide 3-hydroxy-6-methylpyrid-2-thione (3.0 g., 0.021 mole) was dissolved in anyhdrous benzene (50 ml.) by heating and methyl 2,3-dibromopropionate (6.6 g., 0.026 mole) added. The resulting solution was refluxed for one day. The mixture was then evaporated to dryness and the residue crystallized from hot methanol, to yield a white solid (2.3 g., 22%); M.P. 185–188°. Evaporation of the filtrate gave a solid which was essentially the desired product.

The p.m.r. spectrum in DO had peaks at 7.25 (3H, singlet, aryl-$CH_3$), 6.14 (3H, singlet, $OCH_3$ in ester), 4.74 (3H, multiple with doublet superimposed on triplet, $J=7.4$ c./sec).

EXAMPLE 31

Methyl ester of 8-hydroxy-5-methyl-dihydrothiazolo[3,2-a]pyridinium-3-carboxylate [CoU]

(a) 2.7 N methanolic sodium methoxide (8.2 ml., 0.022 mole) was added to 3-hydroxy-6-methylpyrid-2-thione (1.4 g., 0.01 mole) in dry methanol (50 ml.); the yellowish solution was warmed to 40° and methyl 2,3-dibromopropionate (2.86 g., 0.012 mole) added dropwise with stirring over 15 minutes. After the addition was completed the reaction mixture was stirred for another 2 hours at 40° and then evaporated to dryness at reduced pressure. The residual material was extracted with methylene chloride (30 ml.), the insoluble material removed by filtration and the filtrate evaporated. A solution of the residue in acetone (5 ml.) slowly deposited the ester (1.30 g., 58%), M.P. 140–145°. Paper chromatography in $BuOH:AcOH:H_2O$ (100:22:50) gave $R_f=0.60-0.65$ Chromatography in basic systems resulted in ester hydrolysis. The ester has the same blue fluorescence as CoU itself.

(b) CoU (20 mg.) was dissolved in anhydrous methanol (15 ml.) and ethereal diazomethane added dropwise at 0° until the solution remained yellow. The consumption of diazomethane was very slow. The solution was left in the cold overnight. Chromatography showed the presence of some unreacted CoU. The ester was extracted into methylene chloride and the solution evaporated.

(c) CoU (50 mg.) was added to dry methanol (50 ml.) and dry hydrogen chloride passed into the refluxing reaction mixture for 4 hours. A homogeneous solution resulted. The solution was evaporated, the residue dissolved in water (20 ml.), adjusted to pH 6.43 with 0.1 N NaOH and freeze-dried. The residue was well extracted with methylene chloride and the methylene chloride solution evaporated to yield 28 mg. solid residue. This was dissolved in dilute methanol and passed through a Woelm polyamide column (10 x 0.7 cm.). Freeze-drying of the eluate furnished 8.3 mg. of the ester. The I.R. spectrum was identical with that of the above-prepared ester.

EXAMPLE 32

3-cyano-5-methyl-dihydrothiazolo[3,2-a]pyridinium-8-oxide as hydrobromide

To a solution of 3-hydroxy-6-methylpyrid-2-thione (23.2 g., 0.165 mole) in ethyl acetate (550 ml.) was added dropwise over 20 minutes with vigorous stirring under reflux a solution α-bromoacrylonitrile (26.4 g., 0.2 mole) in ethyl acetate (30 ml.). Solid precipitate was formed during the addition. To complete the reaction it was allowed to reflux overnight. On filtering the cold reaction mixture 33 g. (73%) of the hydrobromide was obtained, M.P. 230–40° (dec.). A sample for analysis was recrystallised from water, M.P. 240–42° (dec.). (Found (percent): N, 9.91. Calcd. for $C_9H_8N_2OS \cdot HBr$ (percent): N, 10.26).

EXAMPLE 33

3-carbamoyl-5-methyl-dihydrothiazolo[3,2-a]pyridinium-8-oxide (a) 3-methoxycarbonyl-8-hydroxy-5-methyl-dihydrothiazolo[3,2-a]pyridinium chloride (100 g.) was dissolved in anhydrous methanol (2500 ml.) and ammonia passed through the refluxing solution for 8 hours. Chromatography showed that no reaction had taken place. Water (25 ml.) was therefore added to the solution and the solution refluxed for another 8 hours while ammonia was bubbled through the solution. Chromatography after 3 hours showed that about 70% of the ester had been converted to the amide. Concentration of the solution to about 800 ml. precipitated the amide (30.7 g.), M.P. 260°, which, after recrystallization from water, melted at 270° (dec.). (Found (percent): C, 51.01, H, 4.80; N, 13.45; S, 15.50. Calcd. for $C_9H_{12}N_2O_2S$ (percent): C, 51.41; H, 4.79; N, 13.32; S, 15.22).

(b) 8-hydroxy-5-methyl - dihydrothiazolo[3,2-a]pyridinium-3-carboxylate (0.22 g., 0.001 mole) was dried in vacuo at 60° for 20 hours before addition to thionyl chloride (50 ml.). The reaction mixture was stirred at room temperature overnight when all the solid had dissolved. Excess thionyl chloride was then evaporated at reduced pressure at 25°. The residual solid was triturated twice with anhydrous benzene (2 x 50 ml.) and suspended in benzene (50 ml.). Gaseous ammonia was then passed through the stirred mixture at room temperature for 24 hours. The solid formed (0.42 g.) was shown by chromatograhy to consist of the desired amide and ammonium chloride.

(c) 3-cyano-5-methyl - dihydrothiazolo[3,2-a]pyridinium-3-oxide hydrobromide (1 g., 0.004 mole) was dissolved in 0.88 aq. $NH_3$. After standing for 3 days at room temperature the precipitated amide (0.68 g., 85%) was collected. The precipitated material was chromatographically pure.

EXAMPLE 34

8-hydroxy-5-methyl-2-phenyl-dihydrothiazolo [3,2-a]pyridinium bromide

Solutions of 2-bromocinnamic acid (17.0 g., 0.086 mole) in chlorobenzene (300 ml.) and 3-hydroxy-6-methylpyrid-2-thione (9.9 g., 0.07 mole) in chlorobenzene (500 ml.) were mixed and the resultant solution refluxed for 50 hours. The hydrobromide of the condensation product slowly precipitated during the reaction. There was thus obtained 17.7 g. (78%), M.P. 220–25°, shown by chromatography to be essentially homogeneous. Recrystallisation from ethanol (charcoal treatment) gave white crystals, M.P. 259–60° (dec.). (Found (percent): C, 51.72; H, 4.45; N, 4.40; S, 10.23. Calcd. for $C_{14}H_{13}NOS.HBr$ (percent): C, 51.87; H, 4.35; N, 4.32; S, 9.89).

Due to the high temperature necessary in this reaction decarboxylation of the 3-carboxy derivative of the title compound results. Attempts to carry out the reaction in boiling ethyl acetate, methanol or in DMF at 70° gave no condensation product. To prove that the decarboxylation occurs after condensation and not before to give β-bromo-styrene the following experiments were carried out. Solutions of the thiolactam and β-bromo styrene in ethyl acetate, aqueous methanol and sodium ethoxide were refluxed for about one day. No sign of condensation could be found. Therefore the decarboxylation must occur after the condensation.

EXAMPLE 35

8-hydroxy-5-methyl-dihydrothiazolo[3,2-a] pyridinium-3-carboxylate

A solution of 2-bromo-3-hydroxy-6-methylpyridine (1.0 g., 0.0053 mole) and 2-bromo-3-thioacetylpropionic acid (1.56 g., 0.007 mol) in methanol (20 ml.) was refluxed for 16 hours. Chromatography showed that some of the desired product had been formed in low yield. Similar results were obtained in benzene containing 10% p-nitrophenol.

EXAMPLE 36

L-8-hydroxy-5-methyl - 1-oxo-dihydrothiazolo[3,2-a]pyridinium-3-carboxylate: separation of α- and β-isomers (L-CoU sulphoxide)

(a) Hydrogen peroxide in formic acid: L-8-hydroxy-5-methyldihydrothiazolo[3,2-a]pyridinium - 3-carboxylate semihydrate (5.06 g., 0.023 mole) was dissolved in formic acid (460 ml.) and 30% hydrogen peroxide (4.6 ml., 0.041 mole) added. After standing at room temperature overnight the solution was evaporated to dryness at reduced pressure at 15–25° C. The solid residue was dissolved in water (15 ml.) and left in the cold when the sulphoxide (2.95 g.) crystallized out. To the aqueous filtrate was added ethanol (15 ml.). On allowing the solution to stand in the cold, a second crop (1.1 g.) crystallized out. Total yield 4.05 g. (77%). This material had no M.P. but started decomposing at about 170°. Chromatography showed this to be only one of the diastereoisomers which we have named the α-isomer, $[\alpha]_D = +169$ (C=0.2 in water). (Found (percent): C, 47.5; H, 4.0; N, 6.04. Calcd. for $C_9H_9NO_4S$ (percent): C, 47.56; H, 3.99; N, 6.17). The filtrate was then concentrated to a small volume and preparatively chromatographed on Whatman No. 17. Paper in the system BuOH:AcOH:$H_2O$ (100:22:50). Separate elutions of the two major bands with water and freeze-drying furnished the 2 isomers.

(b) Hydrogen peroxide in acetic acid: The reaction carried out as above required about 2 days, gave nearly equal amounts of the α- and β-isomers and a large proportion of decarboxylated material.

EXAMPLE 37

7-bromo-8-hydroxy-5-methyl-1-oxo-dihydrothiazolo [3,2-a]pyridinium-3-carboxylate 7-bromo-8-hydroxy - 5 - methyl-dihydrothiazolo[3,2-a] pyridinium-3-carboxylate (50 mg., 0.172 mole) was dissolved in formic acid (5 ml.) and 30% $H_2O_2$ (0.1 ml.) added. The solution was left at room temperature overnight. The solvent was then removed at reduced pressure below 35°, the residue dissolved in water (0.5 ml.) and the solution left in the cold when the sulphoxide (13 mg.) crystallized out, M.P.>250° (dec.). (Found (percent): C, 34.74; H, 2.96; N, 4.33. Calcd. for $C_9H_8BrNO_4S$ (percent): C, 34.67; H, 2.63; N, 4.58.)

EXAMPLE 38

3-carbamoyl-5-methyl-1-oxo-dihydrothiazolo [3,2-a]pyridinium-8-oxide

30% hydrogen peroxide (17 ml., 0.15 mole) was added at room temperature to a solution of 3-carbamoyl-5 - methyl - dihydrothiazolo[3,2-a]pyridinium - 8 - oxide (22.0 g., 0.1 mole) in formic acid (400 ml.). The temperature rose to 35° where it remained for about 1 hour. The solution was allowed to stand at room temperature overnight and evaporated at 30–35° at reduced pressure to give a pale yellow oil. Chromatography (BuOH:AcOH:$H_2O$—100:22:50)

showed about equal intensities of the two fluorescent spots ($R_f$=0.19 and 0.25) obtained which means that about equal amounts of the cis and the trans isomers were formed. This material was dissolved in water (70 ml.) and the solution left in the cold overnight. Whitish solid (4.4 g.), M.P. 260–65° (dec.) was obtained. Chromatography showed this to be 90–95° of the isomer with $R_f$=0.19. Addition of ethanol (70 ml.) to the filtrate slowly precipitated more solid with the above composition (7.1 g.), M.P. 255–65° (dec.). The combined fractions were recrystallized (by heating to 70°) from water (350 ml.), yield 7.1 g., M.P. 255–75° (dec.). Chromatography showed this to be a practically pure sample of the isomer with $R_f$=0.19. (Found (percent: C, 47.55; H, 4.53; N, 12.50. Calcd. for $C_9H_{10}N_2O_3S$ (percent): C, 47.77; H, 4.45; N, 12.35.)

The other sulphoxide isomer could be obtained by concentrating the filtrates and repeated recrystallisation of the solid precipitated, M.P. 275° (dec.).

EXAMPLE 39

7-bromo-8-hydroxy-5-methyl-dihydrothiazolo [3,2-a]pyridinium bromide (a) 5 - methyl - dihydrothiazolo[3,2-a]pyridinium-8-oxide (0.17 g., 0.001 mole) was dissolved in a solution of potassium acetate (0.20 g., 0.002 mole) in acetic acid (20 ml.). To this solution at room temperature was then added dropwise bromine (0.11 ml., 0.002 mole) in acetic acid (10 ml.). An orange coloured precipitate was formed almost immediately. The mixture was stirred overnight and the solid was filtered off, washed with water and dried (0.17 g., 52%). Recrystallisation from water gave colourless needles, M.P. 258–62° (dec.). The brominated material is non-fluorescent and gives an immediate precipitate with silver nitrate. Analysis showed it to be the hydrobromide of the desired bromo compound. (Found (percent): C, 29.92; H, 3.12; N, 4.25; Calcd. for $C_8H_8BrNOS.HBr$ (percent): C, 29.38; H, 2.77; N, 4.28.)

(b) 5 - methyl - dihydrothiazolo[3,2-a]pyridinium-3-oxide (51.0 g., 0.3 mole) was dissolved in ethanol (1000 ml.) and bromine (30 ml.) added dropwise over 30 minutes to the stirred refluxing solution. The heating was continued for another hour, then the solution was concentrated to about 750 ml. and left; white crystalline precipitate of the bromohydrobromide (61.1 g., 62%) precipitated.

EXAMPLE 40

7-bromo-8-hydroxy-5-methyl-dihydrothiazolo [3,2-a]pyridinium-3-carboxylate

8 - hydroxy - 5 - methyl - dihydrothiazolo[3,2-a]pyridinium-3-carboxylate semi-hydrate (44.0 g., 0.2 mole) was brominated using the conditions in Example 39. There was obtained 57.6 g.(98%) of the bromo compound, M.P. 210–20° (dec.). Recrystallization from formic acid-water gave white crystals, M.P. 230–240° (dec.). (Found (percent): C, 37.25; H, 2.89; N, 4.95; Br 27.16. Calcd. for $C_9H_8BrNO_3S$ (percent): C, 37.24; H, 2.76; N, 4.83; Br, 27.5.)

EXAMPLE 41

8-hydroxy-7-iodo-5-methyl-dihydrothiazolo [3,2-a]pyridinium-3-carboxylate 3.3 N aq. sodium iododichloride ($NaICl_2$) (46 ml., 0.15 mole) was added dropwise (30 minutes) at 60° to a stirred solution of 8-hydroxy-5-methyl-dihydrothiazolo [3,2-a]pyridinium-3-carboxylate (22.0 g., 0.1 mole) and sodium acetate trihydrate (28.0 g., 0.2 mole) in water (2000 ml.). The mixture was stirred at 60° for 2 hours and another 15 ml. of 3.3 N $NaICl_2$ aq. (0.5 mole) was added, and the reaction stirred at 60° overnight. The precipitated iodo-derivative (20.5 g., 60%), M.P. 210–13° (dec.) was recrystallized from formic acid-water, M.P. 216–219° (dec.). (Found (percent): C, 32.06; H, 2.33; N, 4.06; I, 38.76, Calcd. for $C_9H_8INO_3S$ (percent): C, 32.06; H, 2.39; N, 4.16; I, 37.63.)

EXAMPLE 42

7-chloro-8-hydroxy-5-methyl-dihydrothiazolo [3,2-a]pyridinium-3-carboxylate 5-methyl-dihydrothiazolo[3,2-a]pyridinium - 8 - oxide (8.35 g., 0.05 mole) was added in small portions at 0° C. under vigorous stirring to chlorosulphonic acid (40.5 g., 0.35 mole). Evolution of brown gases was observed. The solution was stirred for 48 hours at room temperature, then poured into appr. 100 ml. ice-water. An instant precipitation of a white crystalline solid took place. It was collected by filtration yielding 7.6 g. solid (50% yield), M.P. 255–330° C. (dec.). Recrystallized twice from ethanol, M.P. 273–330° C. dec. (Found (percent): Cl, 11.6%; N, 5.02%. Calcd. for $C_8H_8ClNOS, H_2SO_4$ (percent): Cl, 11.82; N, 4.67).

EXAMPLE 43

5-methyl-7-nitro-dihydrothiazolo[3,2-a] pyridinium-8-oxide

To 5-methyl-dihydrothiazolo[3,2-a]pyridinium - 8 - oxide (16.7 g., 0.1 mole) in a solution of conc. sulphuric acid (4.9 g., 0.05 mole) in acetic acid (500 ml.) was added dropwise (30 min.) with stirring at room temperature a solution of conc. nitric acid (10 ml., 0.2 mole) and conc. sulphuric acid (4.9 g., 0.05 mole) in acetic acid (50 ml.). The sulphate first formed dissolved slowly, to give a yellowish solution before a pale yellow solid started crystallizing out. After stirring at room temperature overnight the solid (11.4 g., 44.0%), M.P. 182–186°, was collected mainly as the sulphate. Recrystallisation from water gives the free base (barium chloride test negative), M.P. 234–236°. (Found (percent): C, 45.27; H, 3.76; N, 12.80. Calcd. for $C_8H_8N_2O_3S$ (percent): C, 45.32: H, 3.80; N, 13.21).

EXAMPLE 44

8-hydroxy-5-methyl-7-nitro-dihydrothiazolo [3,2-a]pyridinium-3-carboxylate

8 - hydroxy - 5 - methyl-dihydrothiazolo[3,2-a]pyridinium-3-carboxylate (44.0 g., 0.2 mole) was nitrated using the method of Example 43. The orange coloured nitro derivative slowly precipitated (32.4 g., 62%), M.P. 137° (dec.). An analytical sample recrystallized from formic acid-water had M.P. 142° (dec.). (Found (percent): C, 42.17; H, 3.38; N, 11.15. Calcd. for $C_9H_8N_2O_5S$ (percent): C, 42.18; H, 3.15; N, 10.93.)

EXAMPLE 45

3-carboxy-8-hydroxy-5-methyl-dihydrothiazolo- [3,2-a]pyrid-7-thione 7-bromo-8-hydroxy-5 - methyl-dihydrothiazolo[3,2-a] pyridinium-3-carboxylate (21.6 g., 0.075 mole) was added in portions over 10 minutes to a stirred suspension of potassium hydrogen sulphide (11.8 g., 0.165 mole) in anhydrous DMF (500 ml.) at 80°. After being stirred for 1½ hours the dark green solution was evaporated to dryness under reduced pressure and the residue dissolved in water (150 ml.) at 50°. The solution was treated with a little charcoal, the pH brought to 2.5 with HCl, whereupon the pale grey thione was precipitated (12.2 g., 67%), M.P. 188–190°. Recrystallization from methanol or methanol-DMF gave M.P. 193–97°. (Found (percent): C, 44.44; H, 4.00; N, 5.86; S, 25.95. Calcd. for $C_9H_9NO_3S_2$ (percent): C, 44.43; H, 3.73; N, 5.73; S, 26.36.) A similar synthesis from iodo derivative instead of the bromo compound gave 78% yield of the desired thione.

EXAMPLE 46

8-hydroxy-5-methyl - dihydrothiazolo[3,2-a]prid-7-thione 7-bromo-8-hydroxy-5-methyl - dihydrothiazolo[3,2-a] pyridinium bromide (48.9 g., 0.15 mole) was reacted with potassium hydrogen sulphide (35.5 g., 0.49 mole) using the same method as in Example 45. The thione (21.0 g., 70.0%) crystallized out on standing in the cold, M.P. 250–255°. Recrystallization from DMF or large volume of water gave M.P. 252–258° (dec.). (Found (percent): C, 48.17; H, 4.30; N, 7.25; S, 32.61. Calcd. for $C_8H_9NOS_2$ (percent): C, 48.20; H, 4.55; N, 7.03; S, 32.18.)

EXAMPLE 47

Bis-(5,5'-dimethyl-dihydrothiazolo[3,2-a]pyridinium-8,8'-oxo)-7,7'-sulphide

To a stirred suspension of potassium hydrogen sulphide (0.011 mole) in dry DMF (50 ml.) at 65–70° was added portionwise 7 - bromo-8-hydroxy-5-methyl-dihydrothiazolo[3,2-a]pyridinium bromide (3.3 g., 0.01 mole). After being stirred for 2 hours at this temperature the reaction mixture was allowed to cool to room temperature, the yellow crystalline material formed in the reaction collected (2.3 g., 44% as hydrobromide), M.P. ~290° (dec.). Recrystallization from 5% aqueous HBr solution gave M.P. ~300° (dec.).

The free base was obtained by dissolution in water and adjusting the pH to 7.5. Pale yellow crystals formed on standing in the cold; yellowish-brown solid on drying at 80°, M.P. 268–72°. Recrystallization from water again gave pale yellow crystals which turned yellowish-brown on drying, M.P. 267–269°. Addition of a little water to this material again gives back the pale yellow solid. The molecule must contain water of crystallisation which is partly removed on drying. (Found (percent): C, 51.21; H, 4.63; N, 7.86; S, 26.01. Calcd. for $$C_{16}H_{16}N_2O_2S_3 \cdot \tfrac{1}{2}H_2O$$

(percent): C, 51.45; H, 4.59; N, 7.50; S, 25.76.)

EXAMPLE 48

8-acetoxy-5-methyl-dihydrothiazolo-[3,2-a]pyrid-7-thione

Acetic anhydride (1 ml., 0.01 mole) was added dropwise (slowly) to a stirred solution of 8-hydroxy-5-methyl-dihydrothiazolo[3,2-a]pyrid-7-thione (1.0 g., 0.005 mole) in pyridine at 60°. The reaction was kept at 60° for 2 hours, then placed in the cold when yellow plates crystallized out (0.6 g., 50%). The crystals changed form at 200° and melted at 240–245°. Recrystallization from pyridine or DMF gave M.P. 245° with crystal change around 215°. (Found (percent): C, 49.66; H, 4.79; N, 6.00; S, 26.57. Calcd. for $C_{10}H_{11}NO_3S_2$ (percent): C, 49.78; H, 4.60; N, 5.81; S, 26.59.)

EXAMPLE 49

8-hydroxy-5-methyl-1-oxo-dihydrothiazolo [3,2-a]pyridinium-7-sulphonate 8-hydroxy-5-methyl-dihydrothiazolo[3,2-a]pyrid-7-thione (2.0 g., 0.01 mole) was dissolved in formic acid (35 ml.) and 35% $H_2O_2$ (4.9 ml., 0.05 mole) added. The temperature was kept below 40° by external cooling. After standing at room temperature overnight the solution was evaporated to dryness at reduced pressure below 40–45°. The residual oily material was dissolved in cold water (5 ml.). On standing in the cold the desired substance crystallized out (1.12 g., 43%), M.P. 260–75° (dec.). Recrystallization twice from water gave the white solid, M.P. 295–7° (dec.). (Found (percent): C, 36.27; H, 3.45; S, 24.54. Calcd. for $C_8H_9NO_5S_2$ (percent): C, 36.50; H, 3.44; S, 24.35.)

EXAMPLE 50

8-hydroxy-5-methyl-dihydrothiazolo [3,2-a]pyridinium-7-sulphonate 8-hydroxy-5-methyl-1-oxo-dihydrothiazolo[3,2-a]pyridinium-7-sulphonate (0.30 g., 0.0014 mole) dissolved in formic acid (30 ml.) was hydrogenated over 5% palladium on charcoal at 2 kg./cm.² for 5 hours. Chromatography then showed the reaction to be complete and the product to be homogeneous. The catalyst was then removed by filtration, the colourless filtrate evaporated to dryness and the white residual solid recrystallized from formic acid-water (1:5), M.P. 341–46°. (Found (percent): C, 38.76; H, 3.77; N, 5.82; S, 25.93. Calcd. for $C_8H_9NO_4S_2$ (percent): C, 38.96; H, 3.67; N, 5.67; S, 25.93.)

EXAMPLE 51

7-p-chlorophenyl-8-hydroxy-5-methyldihydrothiazolo-[3,2-a]pyridinium-3-carboxylate An ice-cold solution of diazotized p-chlorophenylaniline (prepared from p-chloro-aniline (12.8 g., 0.1 mole), 2 N HCl (125 ml.), and sodium nitrite (6.9 g., 0.1 mole) in water (100 ml.) was added dropwise with stirring at 0° to a solution prepared from 8-hydroxy-5-methyl-dihydrothiazolo[3,2-a]pyridinium-3-carboxylate (21.2 g., 0.1 mole) and sodium bicarbonate (16.4 g., 0.2 mole) in water (200 ml.). After 20 minutes when half of the diazonium solution had been added, 2 N sodium carbonate (25 ml.) was added to the reaction mixture. The addition of the diazonium salt was complete after another 25 minutes. Gas evolution ($N_2$) occurred during the addition and reddish brown solid precipitated out. The reaction mixture was kept in the cold overnight and the solid (12.8 g.), M.P. ~130° (dec.) filtered off. Chromatography showed this to be a mixture of 3 major substances and has not been further studied.

The filtrate, pH 6.3, was adjusted to pH 4.2 with hydrochloric acid when yellowish solid crystallized out (13.7 g.), M.P. 158–64°. Chromatography showed that about 80% of this material was the biaryl derivative. The product was found insoluble in solvents tried and was finally purified by dissolution to give a 10% sodium salt solution and reprecipitation with acetic acid. This was repeated once. The compound then had M.P. 167–71°. (Found (percent): C, 56.05; H, 3.71; N, 4.31. Calcd. for $C_{15}H_{12}ClNO_3S$ (percent): C, 55.98; H, 3.76; N, 4.35%.)

EXAMPLE 52

5-methyl-7-p-nitrophenyl-dihydrothiazolo[3,2-a] pyridinium-8-oxide

Using the method of Example 51, 5-methyl-dihydro-thiazolo[3,2-a]pyridinium-8-oxide (25.0 g., 0.15 mole) was reacted with diazotised p-nitroaniline. A reddish brown solid precipitated out. After stirring for another 2 hours at 0–5° the stirring was continued at room temperature overnight. The pH (7.3) was then adjusted to 5.2 with HCl and the reddish brown solid collected by filtration (35.3 g.), M.P. 160–72° dec. Chromatography showed that about 70% of this material was the biaryl derivative. This material was extracted with boiling ethanol (800 ml.), the insoluble material removed by filtration, the filtrate concentrated to about 150 ml. when the dark red needles were precipitated (11.9 g.), M.P. 210–20°. After recrystallizing twice from ethanol the substance melted at 237–251°. (Found (percent): C, 58.28; H, 4.15; N, 9.73. Calcd. for $C_{14}H_{12}N_2O_3S$ (percent): C, 58.32, H, 4.20; N, 9.72.)

EXAMPLE 53

5-methyl-7-(benzimidazol-2-ylthio)-dihydrothiazole [3,2-a]pyridinium-8-oxide

To a mixture made from 7-bromo-8-hydroxy-5-methyl-dihydrothiazolo[3,2-a]pyridinium bromide (0.98 g., 0.003 mole) and 2N methanolic sodium methoxide (1.5 ml. 0.003 mole) was added a solution of the sodium salt of 2-mercaptobenzimidazole (0.45 g., 0.003 mole) in methanol (50 ml.). The reaction mixture was refluxed for 50 hours, then allowed to stand in the cold when the yellowish condensation product crystallized out (0.10 g.), M.P. 276° (dec.). Recrystallization from aqueous acetic acid gave M.P. 278–9° (dec.). (Found (percent): C, 55.42; H, 4.38; N, 13.27; S, 19.75. Calcd. for $C_{15}H_{13}N_3OS_2 \cdot \tfrac{1}{2}H_2$ percent): C, 55.52; H, 4.53; N. 19.95; S, 19.77.)

EXAMPLE 54

3-hydroxy-6-methylpyrid-2-thione (III)

*From thiourea.*—2-bromo-3-hydroxy-6-methylpyridine (1.9 g., 0.01 mole) and thiourea (1.5 g., 0.02 mole) were heated together in propylene glycol (75 ml.) at 160° for 25 hours. The solution was then evaporated at reduced pressure, the residue dissolved by heating in ethanol (5 ml.) and the hot solution treated with a little charcoal. Yellowish solid precipitated on cooling (0.53 g., 37%), M.P. 167–180°. After recrystallising this material twice from ethanol the pale grey-yellow needles formed underwent crystal change at ~150° and melted at 167–75°. The IR spectra and chromatographic data for this product were the same as for the product prepared with KHS. Therefore the isothiouronium salt originally formed must have been decomposed to the desired product under the vigorous conditions employed.

EXAMPLE 55

Synthesis of 2-bromo-3-hydroxy-6-methyl-4-nitropyridine. (V)

2-bromo-3-hydroxy-6-methylpyridine (9.4 g., 0.05 mole) was dissolved in a mixture of 250 ml. of glacial acetic acid and 20 ml. of formic acid. A mixture of 3.12 g. conc. $HNO_3$ (0.05 mole) and 4.9 conc. $H_2SO_4$ (0.05 mole) in 20 ml. of glacial acetic acid was added dropwise (15 min.) to the above solution, under vigorous stirring. The reaction vessel was kept in a water bath, 18° C. and left for 18 hours. 2.8 g. of unreacted solid, precipitated probably as hydrosulphate was removed by filtration. The filtrate was concentrated in vacuo until a yellow oil was left. It was mixed with 100 ml. of water, warmed until the oil dissolved, chilled and kept at +5° C. for 16 hours. 1.1 g. of a yellow crystallic substance was removed by filtration, chromatographically pure (9.5% yield), M.P. 62–63° C. An analytical sample was purified by vacuum-sublimation. 70° C./0.2 mm. Hg. and had M.P. 67–68° C. Paper chromatography: (Acid system:

BuOH:Acoh:$H_2O$/100:22.50

Base system: BuOH:EtoH:$NH_3H_2O$ 4:1:2:1). $R_f$ acid=0.91; $R_f$ base=0.62, yellow spots in daylight. TLC on normal cellulose covered plates: $R_f$ acid: 0.95, yellow spot.

UV spectroscopy:
In 0.1 N HCl λ. max. at 213 m$\mu$ and 360 m$\mu$
$\epsilon$=15.200 and 3.400
In 0.1 N NaOH λ max. at 230 m$\mu$
$\epsilon$=14,80
IR spectrum: Strong bonds at 152 and 1570 cm.$^{-1}$ and at 1320 cm.$^{-1}$ ($NO_2$ region)
Remark: When repeated with 2 mole equivalent $HNO_3$, no unreacted solid could be detected but the reaction occurs to be less clear. The yield can be increased as indicated by preliminary tests.

EXAMPLE 56

Synthesis of 3-hydroxy-6-methyl-4-nitropyrid-2-thione (VI)

2 - bromo - 3 - hydroxy-6-methyl-4-nitropyridine (0.2 g. 0.85 mole) was dissolved in 25 ml. dry dimethylformamide (DMF). KHS was added (1 g. 1.4 mole) and the mixture was heated at 100° C. for 6 hours, then left for 16 hours at room temp. 0.8 g. of unreacted KHS and some polymerization product was removed by filtration. The filtrate was mixed with 130 ml. of water. 2 N HCl was added (30 ml.), then the title compound was extracted with ethylacetate (3 x 20 ml.). The extract was concentrated in vacuo (2 ml.) and some precipitated inorganic salts were removed by filtration. 20 ml. of water were added to the filtrate and the precipitated yellowish solid was collected by filtration, yielding 45 mg. of the title compound (28% yield). M.P. 190–198° C. decomp.

Paper chromatography: BuOH:AcOH:$H_2O$/100:22:50 (acid) BuOH:EtOH:$NH_3$:$H_2O$/4:1:2:1 (base)
$R_f$ acid: 0.95; $R_f$ base: 0.95, absorbing spots in UV-light
TLC on silica gel G—coated plates
$R_f$ acid: 0.75, green spot
Normal cellulose-coated plate
$R_f$ acid: 0.95
UV spectroscopy:
In 0.1 N HCl λmax. at 253 and 358 m$\mu$
$\epsilon$=9000 and 6700 m$\mu$
In 0.1 N NaOH λmax. at 238, 325 and 380 m$\mu$
$\epsilon$=11.100, 4.700 and 4.500 m$\mu$
IR spectrum: 1580 and 1355 cm.$^{-1}$: strong bonds ($NO_2$ region).

EXAMPLE 57

Synthesis of 2,3-dihydroxy-4-nitropyridine (VIII) and 2,3-dihydroxy-6-nitropyridine (IX) and their separation 2,3-dihydroxypyridine (2.2 g., 0.02 mole) was dissolved in glacial acetic acid (70 ml.). Conc. $HNO_3$ (2.5 g., 0.04 mole) and conc. $H_2SO_4$ (1.96 g., 0.02 mole) were mixed in 20 ml. of glacial acetic acid and added to the first solution (dropwise, 10 min.) under vigorous stirring. The reaction vessel was kept in a water bath at 18° C. 18 hours later the solution was concentrated in vacuo. The residual oil was dissolved in 50 ml. of water and extracted with ethyl ether (5 x 20 ml.). The ether layer was then concentrated in vacuo until the appearance of the first crystals. They were collected by filtration and consisted of the 2,3-dihydroxy-6-(-4-)nitropyridine (B), 0.2 g. (6% yield). M.P. 205–214° C., dec.

Continued vacuum-concentration of the filtrate yielded 0.4 g. of the 2,3-dihydroxy-4-(-6-)nitropyridine (A) contaminated with 10–15% of the compound B. (appr. 10% yield). M.P. 134–155° C. dec. Further purification of the compound A will be made by fractional crystallisation.

UV spectroscopy:
Comp. A: 0.1 N HCl: λmax. at 228, 290 and 377 m$\mu$
$\epsilon$=6.600, 3.900 and 5.200
0.1 N NaOH: λmax. at 256 and 298 m$\mu$
$\epsilon$=6.700 and 5.000
Comp. B: 0.1 N HCl: λmax. at 275 and 366 m$\mu$
$\epsilon$=2.260 and 7.500
0.1 N NaOH: λmax. at 255 m$\mu$
$\epsilon$=6.800
Paper chromatography: (acid and base systems: as earlier)
Comp. A: $R_f$ acid: 0.40
$R_f$ base: 0.18, yellow spots in daylight
Comp. B: $R_f$ acid: 0.71
$R_f$ base: 0.36, yellow spots in daylight
TLC: Best results on normal cellulose coated plates developed in the acid-system.
Comp. A: $R_f$ acid: 0.48; Comp. B: $R_f$ acid: 0.60
IR spectroscopy:
Comp. A: Strong bonds at 1540 and 1345 cm.$^{-1}$ ($NO_2$ region).
Comp. B: Strong bonds at 1525 and 1330 cm.$^{-1}$.

EXAMPLE 58

2,3-dibromopropionyl-L-alanine ethyl ester (II)

To a stirred suspension of L-alanine ethyl ester hydrochloride (15.4 g., 0.1 mole) in dioxane (200 ml.) was added slowly triethylamine (11.0 g., 0.11 mole). After stirring for ½ hour at R.T. the suspension was cooled down to 10°, more triethylamine (11.0 g., 0.11 mole) added, and 2,3-dibromopropionyl chloride (27.5 g., 0.11 mole) dissolved in dioxane (50 ml.) added dropwise over 1 hour to the stirred suspension of 10°. After stirring for an additional 2 hours at room temperature the precipitated triethylamine hydrochloride was removed by filtration, washed with dioxane (100 ml.), the combined washings and filtrate evaporated, and the residual oily material (41 g.) extracted with boiling ligroin several times (in all 450 ml.). On cooling a crystalline material as white needles (13.4 g., 41%) separated from the extracts, M.P. about 85°. Further recrystallisation from ligroin gave M.P. 84–87°, difficult to determine due to ease of sublimation (Found (percent): C, 29.46; H, 4.09: N, 4.36. Calcd. for $C_8H_{13}Br_2NO_3$ (percent): C, 29.02; H, 3.96; N, 4.09. [α]$_D$=−38 (C=2.7 in EtOH).

Concentration of the filtrate from the ligroin extracts after filtering off the desired dibromopropionyl derivative left an oily material (11.8 g.), which was extracted with boiling pet. ether (100 ml.) and the pet. ether evaporated yielding an oily material (4.6 g.) which was found to be mainly α-bromoacryl-alanine ethyl ester.

EXAMPLE 59

α-bromoacryl-L-alanine ethyl ester (III)

1.0 N-methanolic sodium methylate (20 ml. 0.02 mole) diluted with methanol (50 ml.) was added dropwise over 2 hours at room temperature to a solution of 2,3-dibromopropionyl-L-alanine-ethyl ester (6.62 g., 0.02 mole) in methanol (100 ml.). The mixture was then concentrated to dryness at reduced pressure, the residue extracted several times with hot pet. ether (B.P. 40–60°, in all 350 ml.) and the extracts evaporated yielding the desired substance as a pale yellow oil (5.1 g., 100%). This material was chromatographically homogeneous and was used in further synthetic work without any additional purification. $[\alpha]_D = -24$ (C=1.7 in EtOH).

EXAMPLE 60

3-barbamido (L-alanine ethyl ester)-8-hydroxy-5-methyl-dihydrothiazolo(3,2-a)pyridinium bromide (V)

A solution of α-bromoacryl-L-alanine ethyl ester (5.0 g., 0.02 mole) in ethyl acetate (50 ml.) was added dropwise to a boiling solution of 3-hydroxy-6-methylpyrid-2-thione (2.52 g., 0.02 mole) in ethyl acetate (100 ml.). A solid was gradually precipitated. After refluxing with stirring for 24 hours, the mixture was allowed to reach room temperature and filtered; (5.3 g., 68%), M.P. 218–222°. Recrystallisation from acetic acid gave white crystalline material, M.P. 225–228°. Found (percent): C, 42.99; H, 4.77; N, 7.20, Calcd. for $C_{14}H_{18}N_2O_4S \cdot HBr$ (percent): C, 42.95; H, 4.90; N, 7.16).

$[\alpha]_D = -76$ (C=1.4 in MeOH)

Hydrolysis of this material in boiling 6 N HCl is complete after 2 hours. The CoU thus obtained was weakly levo rotatory.

$[\alpha]_D = -3$ (C=1.1 in 0.1 N NaOH).

EXAMPLE 61

Synthesis of trans-2,3-dicarboxyl-5-methyl-dihydrothiazolo (3,2-a) pyridinium-8-oxide 3-hydroxy-6-methylpyrid-2-thione (20 g., 0.142 mole) and bromomaleic anhydride (37.6 g., 0.214 mole) were dissolved in ethylacetate (350 ml.) and stirred for three hours at room temperature, then left for 18 hours. An additional mole equivalent of bromomaleic anhydride was added in order to complete the reaction, and stirred again for 2 hours. Water was added (200 ml.) and stirred for 6 hours at room temperature. The mixture was then vacuum concentrated till all the ethylacetate was distilled off.

Dark coloured solid was collected by filtration (12.8 g.), M.P. 205–220° as the crude HBr salt.

The pH of the mother liquor was adjusted with 6N NH₄OH to pH 7.0, then the impurities were removed by extraction with ethyl-ether (5 x 20 ml.), followed by charcoal treatment. The pH was lowered to 2.8 with 6 N HCl. A white crystalline solid precipitated, it is the free, trans acid. M.P. 181–184° C., recrystallized from water, an analytical sample had M.P. 182–185° C.

The vacuum concentration of the mother liquor yields more of the crystalline solid, the total weight of which is 9 g. (Yield: 38% as HBr salt and 25% as free acid, it is 63% total yield.) (Found (percent): for the free acid: C, 46,67; H, 3.57; N, 5.64; S, 12.16. Calcd. for $C_{10}H_9NO_5S$ (percent): C, 46.06; H, 3.55; N, 5.49; S, 12.56.)

What is claimed is:

1. A compound selected from the group consisting of compounds having the following structure

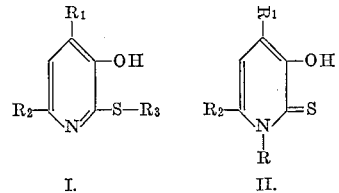

where $R_1$ is hydrogen or nitro; $R_2$ is hydrogen or methyl; $R_3$ is hydrogen, lower alkyl, hydroxy lower alkyl, and carboxy lower alkyl; and R is hydrogen or lower alkyl and the physiologically compatible acid addition salts thereof.

2. 3-hydroxy-6-methyl-pyrid-2-thione.
3. 3-hydroxy-6-methyl-2-methylthiopyridine.
4. 2-(β-hydroxyethylthio)-3-hydroxy-6-methylpyridine.
5. 1-ethyl-3-hydroxy-6-methylpyrid-2-thione.
6. 3-hydroxy-2-ethylthio-6-methylpyridine.
7. 2-carboxymethylthio-3-hydroxy-6-methylpyridine.

References Cited

UNITED STATES PATENTS 1,753,658  12/1926  Kochendoerfer _____ 260—294.8

HENRY R. JILES, Primary Examiner

A. L. ROTMAN, Assistant Examiner

U.S. Cl. X.R.

424—263